US008547048B2

(12) United States Patent
Murata

(10) Patent No.: US 8,547,048 B2
(45) Date of Patent: Oct. 1, 2013

(54) DRIVE CONTROL CIRCUIT FOR LINEAR VIBRATION MOTOR

(75) Inventor: Tsutomu Murata, Mizuho (JP)

(73) Assignees: Semiconductor Components Industries, LLC, Phoenix, AZ (US); Sanyo Semiconductor Co., Ltd., Gunma (JP)

(*) Notice: Subject to any disclaimer, the term of this patent is extended or adjusted under 35 U.S.C. 154(b) by 431 days.

(21) Appl. No.: 13/013,234

(22) Filed: Jan. 25, 2011

(65) Prior Publication Data
US 2011/0181210 A1 Jul. 28, 2011

(30) Foreign Application Priority Data
Jan. 28, 2010 (JP) ................................. 2010-017394

(51) Int. Cl.
 H02K 33/16 (2006.01)
(52) U.S. Cl.
 USPC ............ 318/686; 318/114; 318/119; 318/293
(58) Field of Classification Search
 USPC ................. 318/114, 119, 127, 128, 129, 135, 318/293, 686, 687
 See application file for complete search history.

(56) References Cited

U.S. PATENT DOCUMENTS

| 3,649,893 | A * | 3/1972 | Lajoie | 318/119 |
|---|---|---|---|---|
| 6,441,571 | B1 * | 8/2002 | Ibuki et al. | 318/114 |
| 6,538,402 | B2 * | 3/2003 | Gokturk et al. | 318/128 |
| 6,548,971 | B2 * | 4/2003 | Gokturk | 318/114 |
| 2005/0162105 | A1 * | 7/2005 | Yamasaki et al. | 318/114 |
| 2008/0191648 | A1 * | 8/2008 | Ito et al. | 318/128 |

FOREIGN PATENT DOCUMENTS

| CN | 1288285 A | 3/2001 |
|---|---|---|
| CN | 1459921 A | 12/2003 |
| CN | 101065578 A | 10/2007 |
| CN | 101546950 A | 9/2009 |
| JP | 08-101722 A | 4/1996 |
| JP | 10-075881 A | 3/1998 |
| JP | 2001-016892 | 1/2001 |

OTHER PUBLICATIONS

Chinese Office Action, and English translation thereof, issued in Chinese Patent Application No. 201110022259.2 dated Jan. 4, 2013.

* cited by examiner

*Primary Examiner* — Bentsu Ro
(74) *Attorney, Agent, or Firm* — McDermott Will & Emery LLP

(57) ABSTRACT

A drive signal generating unit generates a drive signal used to alternately deliver a positive current and a negative current to a coil with a nonconducting period inserted between conducting periods. A driver unit generates a drive current in response to the drive signal generated by the drive signal generating unit and supplies the drive current to a coil. The drive signal generating unit estimates the eigen frequency of a linear vibration motor based on a detected position of the zero cross occurring in the coil during the nonconducting period, and the frequency of the drive signal is brought close to the estimated eigen frequency. The zero-cross detecting unit sets a detection window for avoiding the detection of zero cross of voltages other than the induced voltage. The zero-cross detecting unit enables a zero cross detected within the detection window and disables a zero cross detected outside the detection window.

5 Claims, 20 Drawing Sheets a: POSITIVE DRIVE START VALUE
b: POSITIVE DRIVE CENTER VALUE
c: POSITIVE DRIVE END VALUE d: NEGATIVE DRIVE START VALUE
e: NEGATIVE DRIVE CENTER VALUE
f: NEGATIVE DRIVE END VALUE

DRIVE CONTROL CIRCUIT FOR LINEAR VIBRATION MOTOR

This application is based upon and claims the benefit of priority from the prior Japanese Patent Application No. 2010-017394, filed on Jan. 28, 2010, the entire contents of which are incorporated herein by reference.

BACKGROUND OF THE INVENTION

1. Field of the Invention

The present invention relates to a drive control circuit used to control the drive of a linear vibration motor, including a vibrator and a stator, where the vibrator linearly oscillates back and forth relative to the stator.

2. Description of the Related Art

Though a linear vibration motor is used for a specific purpose of moving an electric shaver and the like, its use is expanding in recent years. For example, the linear vibration motor is used for an element that creates a vibration with which an operation feeling of a touch panel pressed down is to be fed back to a user. As haptics (sense of touch) engineering is finding rapidly increasing use, it is expected that the total number of linear vibration motors shipped from factories be on the increase.

The linear vibration motor is preferably driven at a frequency as close to its eigen frequency as possible (hereinafter, this eigen frequency will be referred to as "resonance frequency" also). The linear vibration motor generates the most powerful vibration when the resonance frequency thereof agrees with the drive frequency.

Since the eigen frequency of the linear vibration motor is determined by the mass of the vibrator and the spring constant, the eigen frequency varies from one product to another. Thus, in the conventional method where a fixed drive frequency is set to all drive circuits for the linear vibration motors, there are drive circuits with a significant disagreement between the eigen frequency of the motor and the drive frequency thereof, thereby causing a drop in the yield. Also, even though the eigen frequency of the motor and the drive frequency thereof agree at first, there are cases where they deviate from each other with time and the vibration gets weaker.

The present inventor has found the method such that the eigen frequency of the linear vibration motor is estimated base on a detection position of the zero cross of an induced voltage occurring in the coil of the electromagnet and the adaptive control is performed in such a manner that the eigen frequency is made to agree with the frequency of the drive signal of the linear vibration motor.

SUMMARY OF THE INVENTION

To address the foregoing problems, the inventor of the present invention had found out a method in which the eigen frequency of the linear vibration motor is estimated from zero crosses of an induced voltage occurring in a coil of an electromagnet and thereby the cycle width of a drive signal is adaptively controlled in such a manner that the frequency of the drive signal can agree with the eigen frequency thereof.

A drive control circuit of a linear vibration motor according to one embodiment of the present invention is a drive control circuit of a linear vibration motor, having a stator and a vibrator at least one of which is constituted by an electromagnet, which vibrates the vibrator relative to the stator by supplying a drive current to a coil of the electromagnet. The drive control circuit comprises: a drive signal generating unit configured to generate a drive signal used to alternately deliver a positive current and a negative current to the coil with an nonconducting period inserted between conducting periods; a driver unit configured to generate the drive current in response to the drive signal generated by the drive signal generating unit so as to supply the drive current to the coil; an induced voltage detector configured to detect an induced voltage occurring in the coil during the nonconducting period; and a zero-cross detecting unit configured to detect a zero cross of the induced voltage detected by the induced voltage detector. The drive signal generating unit estimates an eigen frequency of the linear vibration motor based on a detected position of the zero cross thereof, and the frequency of the drive signal is brought close to the estimated eigen frequency, and the zero-cross detecting unit sets a detection window for avoiding the detection of zero cross of voltages other than the induced voltage, and the zero-cross detecting unit enables a zero cross detected within the detection window and disables a zero cross detected outside the detection window.

Optional combinations of the aforementioned constituting elements, and implementations of the invention in the form of methods, apparatuses, systems and so forth may also be effective as additional modes of the present invention.

BRIEF DESCRIPTION OF THE DRAWINGS

Embodiments will now be described by way of examples only, with reference to the accompanying drawings which are meant to be exemplary, not limiting, and wherein like elements are numbered alike in several Figures in which:

FIG. 7A shows a transition of coil derive voltage when a drive cycle is in a default state;

FIG. 7B shows a transition of coil drive voltage (without the adjustment of the width of a conducting period) after a drive cycle has been adjusted to a longer drive cycle from the default state;

FIG. 7C shows a transition of coil drive voltage (the width of a conducting period being adjusted) after a drive cycle has been adjusted to a longer drive cycle from the default state;

FIG. 10A shows the transitions of coil drive voltages and vibration level of a linear vibration motor when the first rise control is not performed;

FIG. 10B shows the transitions of coil drive voltages and vibration level of a linear vibration motor when the first rise control is performed;

FIG. 11A shows the transition of coil drive voltages when the second rise control is not performed;

FIG. 11B shows the transition of coil drive voltages when the second rise control is performed;

FIG. 13A shows the transition of coil drive voltages when the stop control is not performed;

FIG. 13B shows the transition of coil drive voltages when the stop control is performed;

FIG. 13C shows the transition of coil drive voltages when the stop control is performed using PWM signals;

FIG. 14A shows the transitions of coil drive voltages and vibration level of a linear vibration motor when the number of cycles for a drive signal during the motor running is large;

FIG. 14B shows the transitions of coil drive voltages and vibration level of a linear vibration motor when the number of cycles for a drive signal during the motor running is small;

FIG. 15A shows the transitions of coil drive voltages and vibration level of a linear vibration motor when the number of cycles for the drive signal during the motor running is large;

FIG. 15B shows the transitions of coil drive voltages and vibration level of a linear vibration motor when the number of cycles for the drive signal during the motor running is small;

FIG. 19A shows the transitions of voltage across a coil and edge signal when a zero cross of induced voltage occurs within a detection window;

FIG. 19B shows the transitions of voltage across a coil and edge signal when the zero cross of induced voltage does not occur within a detection window (the drive frequency being strictly less than the resonance frequency);

FIG. 19C shows the transitions of voltage across a coil and edge signal when the zero cross of the induced voltage does not occur within a detection window (the drive frequency being strictly greater than the resonance frequency);

FIG. 20A shows the transitions of voltage across a coil and edge signal when the zero cross of induced voltage does not occur within a detection window (the drive frequency being strictly less than the resonance frequency); and FIG. 20B shows the transitions of voltage across a coil and edge signal when the zero cross of induced voltage does not occur within a detection window (the drive frequency being strictly greater than the resonance frequency).

DETAILED DESCRIPTION OF THE INVENTION

The invention will now be described by reference to the preferred embodiments. This does not intend to limit the scope of the present invention, but to exemplify the invention.

(Basic Configuration)

Figure 1:
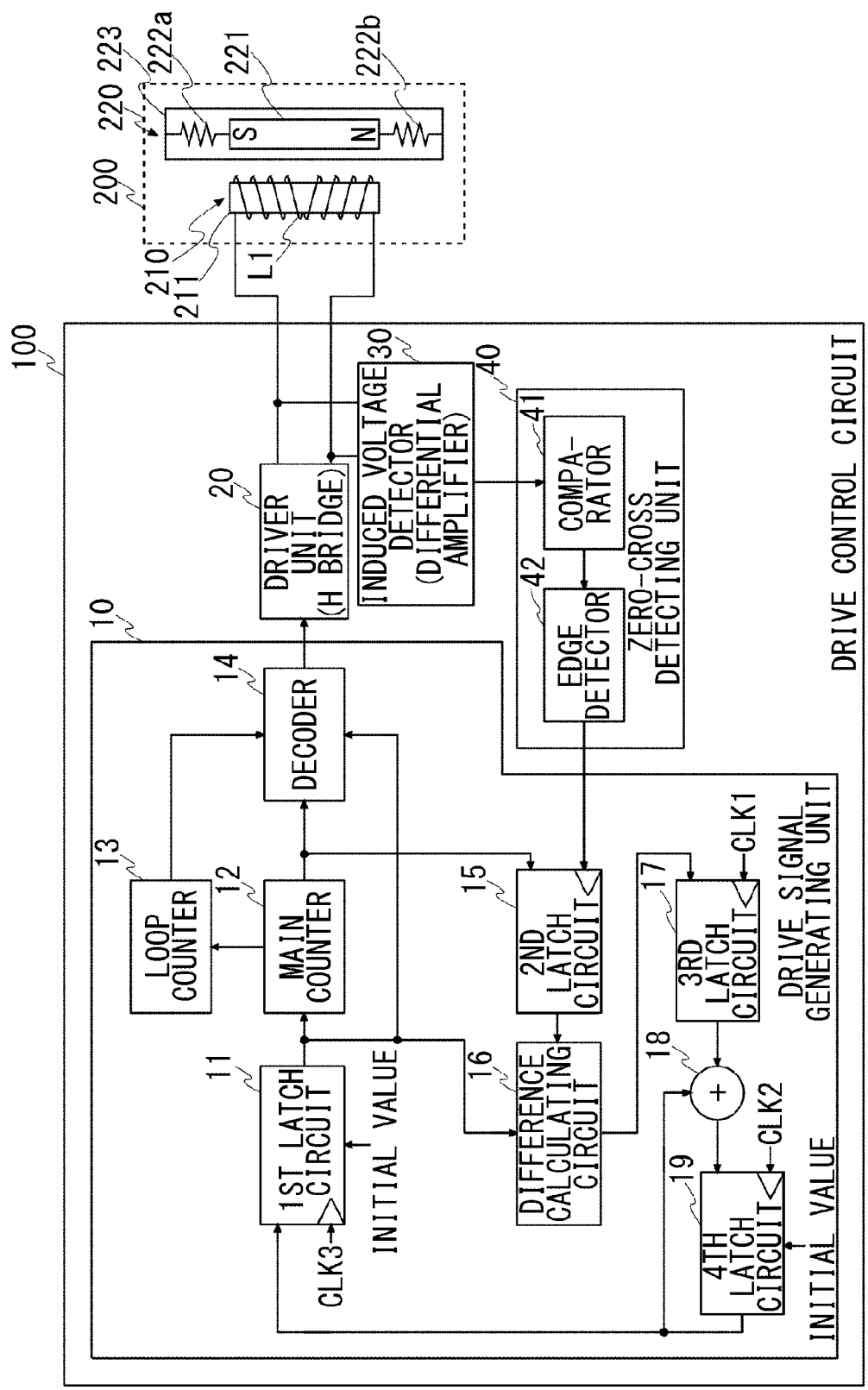
FIG. 1 shows a configuration of a drive control circuit of a linear vibration motor according to an embodiment of the present invention.

FIG. 1 shows a configuration of a drive control circuit 100 of a linear vibration motor 200 according to an embodiment of the present invention. The linear vibration motor 200 has a stator 210 and a vibrator 220, and at least one of the stator 210 and the vibrator 220 is constructed of an electromagnet. In the present embodiment, the stator 210 is constructed of an electromagnet. The stator 210 is formed such that a coil L1 is wound around a core 211 formed of a magnetic material; the stator 210 operates, as a magnet, with the current supplied to the coil L1. The vibrator 220 includes a permanent magnet 221, and the both ends (south pole side and north pole side) of the permanent magnet 221 are fixed to a frame 223 through springs 222a and 222b, respectively. The stator 210 and the vibrator 220 are arranged side by side with a predetermined spacing therebetween. It is to be noted here that, instead of the example of FIG. 1, the vibrator 220 may be constructed of an electromagnet and the stator 210 may be constructed of a permanent magnet.

A drive control circuit 100 supplies a drive current to the above-described coil L1 and has the vibrator 220 oscillate linearly back and forth relative to the stator 210. The drive control circuit 100 includes a drive signal generating unit 10, a driver unit 20, an induced voltage detector 30, and a zero-cross detecting unit 40.

The drive signal generating unit 10 generates a drive signal with which a positive current and a negative current are alternately delivered to the coil L1 with a nonconducting period (no-power period) inserted between conducting periods. The driver unit 20 generates the drive current in response to the drive signal generated by the drive signal generating unit 10 and then supplies the thus generated drive current to the coil L1. The induced voltage detector 30, which is connected to the both ends of the coil L1, detects a difference of electrical potentials at the both ends of the coil L1. The induced voltage detector 30 principally detects an induced voltage occurring in the coil L1 during a nonconducting period. The zero-cross detecting unit 40 detects zero crosses of the induced voltage detected by the induced voltage detector 30.

The drive signal generating unit 10 estimates an eigen frequency of the linear vibration motor 200 from a detected position of the zero cross of the induced voltage detected by the zero-cross detecting unit 40, and the frequency of the drive signal is brought as close to the estimated eigen frequency as possible. In other words, the frequency of the drive signal is adaptively varied so that the frequency of the drive signal can agree with the eigen frequency.

More specifically, the drive signal generating unit 10 calculates a difference between an end position of each cycle of the drive signal and a detection position of the zero cross to be associated with the end position, and adds the calculated difference to a cycle width of the present drive signal so as to adaptively control the cycle width of the drive signal. If a cycle of the drive signal is formed by a normal phase (zero→positive voltage→zero→negative voltage→zero), the detection position of the zero cross to be associated with the end position will be a zero-cross position in which the induced voltage crosses zero from a negative voltage to a positive voltage. In contrast thereto, if a cycle of the drive signal is formed by an opposite phase (zero→negative voltage→zero→positive voltage→zero), the detection position of the zero cross to be associated with the end position will be a zero-cross position in which the induced voltage crosses zero from a positive voltage to a negative voltage.

A detailed description is hereunder given of a configuration of the drive control circuit 100. A description is first given of the configurations of the drive unit 20, the induced voltage detector 30 and the zero-cross detecting unit 40. The zero-cross detecting unit 40 includes a comparator 41 and an edge detector 42. The comparator 41 compares the induced voltage detected by the induced voltage detector 30 against a reference voltage used to detect the zero cross. The comparator 41 inverts an output with timing with which the induced voltage crosses the reference voltage. For example, the inversion is made from a low level to a high level. The edge detector 42 detects the position, where the output of the comparator 41 is inverted, as an edge.

Figure 2:
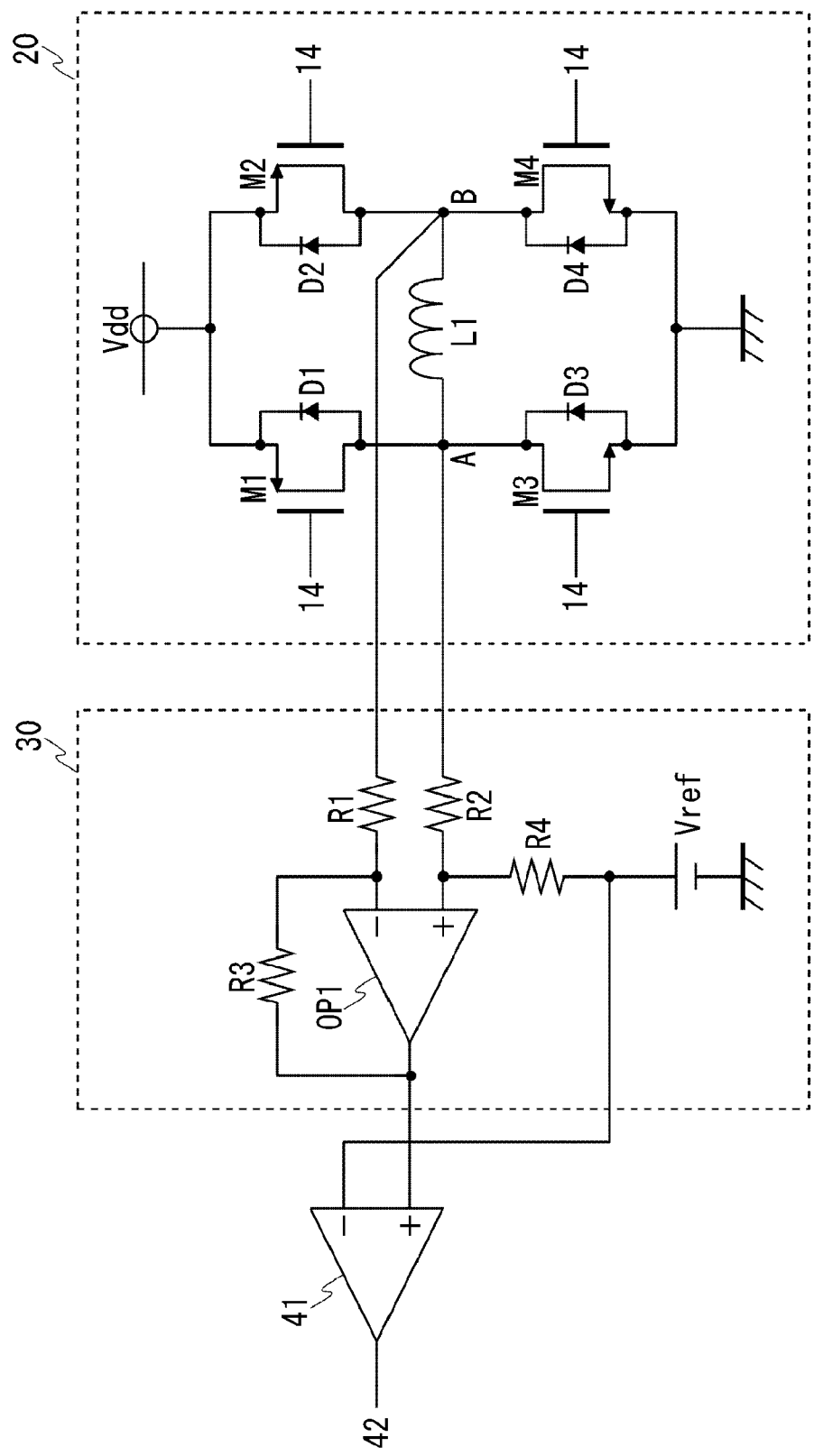
FIG. 2 shows exemplary configurations of a driver unit, an induced voltage detector and a comparator.

FIG. 2 shows exemplary configurations of the driver unit 20, the induced voltage detector 30 and the comparator 41. FIG. 2 shows an example where the drive unit 20 is configured by an H-bridge circuit, and the induced voltage detector 30 is configured by a differential amplifier circuit.

The H-bridge circuit includes a first transistor M1, a second transistor M2, a third transistor M3, and a fourth transistor M4. For convenience of explanation, the coil L1 of the linear vibration motor 200 is depicted within the driver unit 20 demarcated by dotted lines in FIG. 2. A first series circuit comprised of the first transistor M1 and the third transistor M3 and a second series circuit comprised of the second transistor M2 and the fourth transistor M4 are each connected between a power supply potential Vdd and a ground potential. A connection point between the first transistor M1 and the third transistor M3 is hereinafter called "point A", whereas a connection point between the second transistor M2 and the fourth transistor M4 is hereinafter called "point B". The coil L1 is connected between the point A and the point B.

Referring to FIG. 2, the first transistor M1 and the second transistor M2 are each constituted by a P-channel MOSFET, and a first diode D1 and a second diode D2 are connected between a source and a drain of the first transistor M1 and between a source and a drain of the second transistor M2, respectively, as body diodes. The third transistor M3 and the fourth transistor M4 are each constituted by an N-channel MOSFET, and a third diode D3 and a fourth diode D4 are connected between a source and a drain of the third transistor M3 and between a source and a drain of the fourth transistor M4, respectively, as body diodes.

The aforementioned drive signal is inputted to a gate of the first transistor M1, a gate of the second transistor M2, a gate of the third transistor M3 and a gate of the fourth transistor M4 from the drive signal generating unit 10 (more precisely, a decoder 14 discussed later). Using this drive signal, a positive current flows through the coil L1 when control is performed such that the first transistor M1 and the fourth transistor M4 are turned on and the second transistor M2 and the third transistor M3 are turned off. Also, using this drive signal, a negative current flows through the coil L1 when control is performed such that the first transistor M1 and the fourth transistor M4 are turned off and the second transistor M2 and the third transistor M3 are turned on.

The aforementioned differential amplifier circuit includes an operational amplifier (op-amp) OP1, a first resistor R1, a second resistor R2, a third resistor R3 and a fourth resistor R4. An inverting input terminal of the op-amp OP1 is connected to the point B via the first resistor R1, whereas a noninverting input terminal of the op-amp OP1 is connected to the point A via the second resistor R2. The inverting input terminal of the op-amp OP1 and an output terminal of the op-amp OP1 are connected via the third resistor R3. A reference voltage Vref is applied to the noninverting input terminal of the op-amp OP1 via the fourth resistor R4, as an offset voltage The value of the first resistor R1 and the value of the second resistor R2 are set to the same resistance value, whereas the value of the third resistor R3 and the value of the fourth resistor R4 are set to the same resistance value. Under this condition, the gain of the differential amplifier circuit is R3/R1. For example, the resistance value of the first resistor R1 and the resistance value of the second resistor R2 are each set to 10 KΩ, and the resistance value of the third resistor R3 and the resistance value of the fourth resistor R4 are each set to 20 KΩ, thereby amplifying the voltage across the coil L1 (voltage between the point A and the point B) by a factor of 2.

The reference voltage Vref is applied to an inverting input terminal of the comparator 41. The comparator 41 is configured by an operational amplifier of open loop. A noninverting input terminal of the comparator 41 is connected to the output terminal of the op-amp OP1, and an output voltage of the op-amp OP1 is applied to the noninverting input terminal. If the reference voltage Vref is applied to the differential amplifier circuit as an offset voltage (e.g., ½ Vdd), the reference voltage Vref will be used as a reference voltage for the comparator 41 in order to match the range of the op-amp OP1 with the range of the comparator 41. If no offset voltage is applied to the differential amplifier circuit, a ground voltage will be used as the reference voltage for the comparator 41.

In this manner, the voltage across the coil L1 (voltage between the point A and the point B) is first amplified by the differential amplifier circuit and then the thus amplified voltage is inputted to the comparator 41, so that the degree of accuracy in detecting the zero cross of the induced voltage occurring in the coil L1 can be improved.

Figure 3:
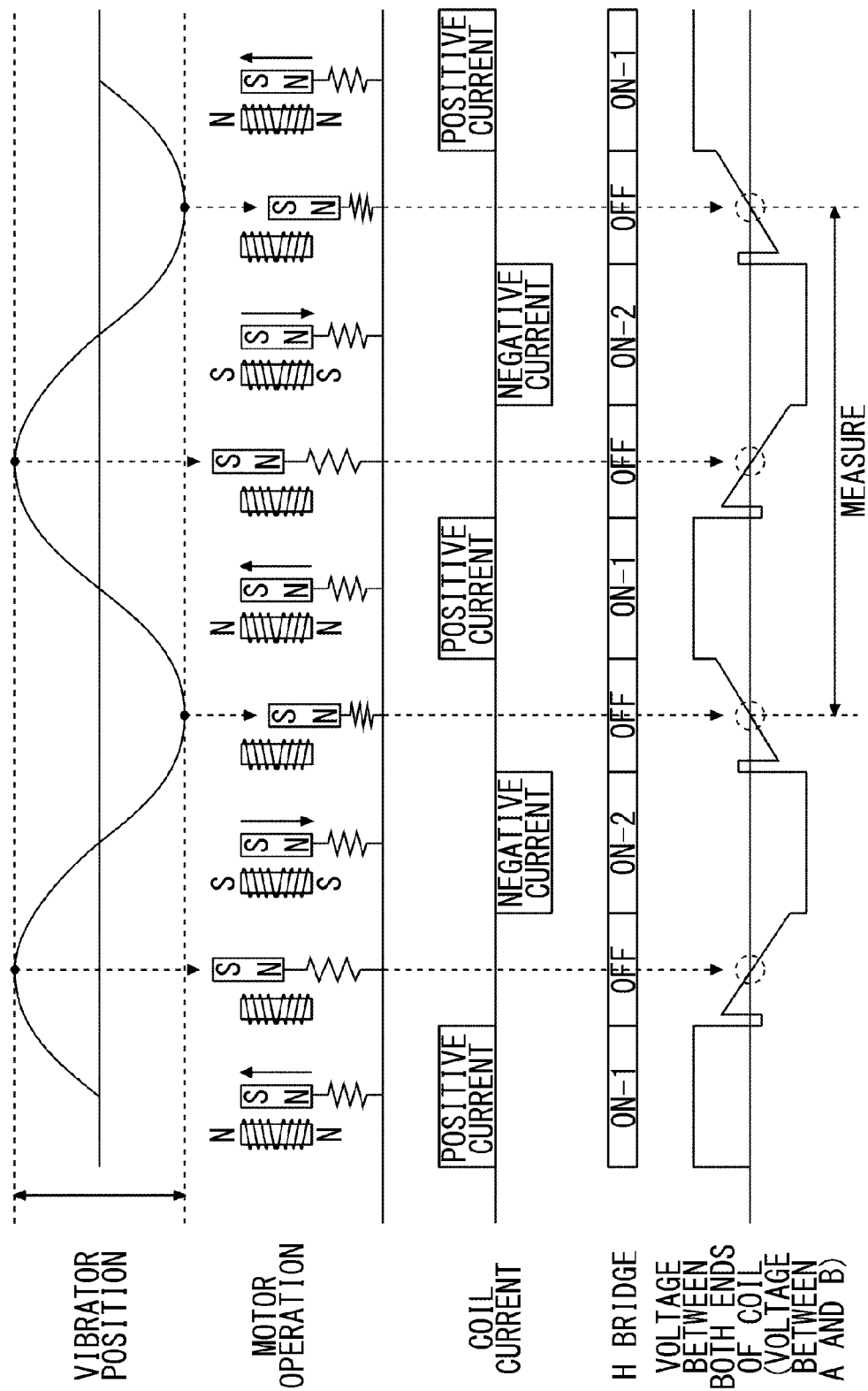
FIG. 3 is a timing chart showing an exemplary operation of a drive control circuit according to an embodiment.

FIG. 3 is a timing chart showing an exemplary operation of the drive control circuit 100 according to an embodiment. This exemplary operation thereof is an example where the linear vibration motor 200 is driven by single-phase full-wave current. In this case, nonconducting periods are determined. The nonconducting periods are set before and after a positive current conducting period and also the nonconducting periods are set before and after a negative current conducting period. In other words, a full cycle is composed of a first half cycle and a second half cycle; the first half cycle is composed of a nonconducting period, a positive current conducting period and a nonconducting period, whereas the second half cycle is composed of a nonconducting period, a negative current conducting period, and a nonconducting period. In the following example, of a half cycle of 180 degrees, a period corresponding to 40 degrees is assigned to the nonconducting period, a period corresponding to 100 degrees is assigned to the positive current conducting period and the negative current conducting period, and a period corresponding to 40 degrees is assigned to the nonconducting period. Thus, 5⁄9 of a cycle is allotted to the conducting periods, whereas 4⁄9 thereof is allotted to the nonconducting periods. In this patent specification, a drive system implementing this ratio is called a 100-degree conduction.

In FIG. 3, when the H-bridge circuit is in an ON-1 state (M1 and M4 being on and M2 and M3 being off), the positive current flows through the coil L1. No drive current flows through the coil L1 while the H-bridge circuit is in an OFF state (M1 to M4 being off). When the H-bridge circuit is in an ON-2 state (M1 and M4 being off and M2 and M3 being on), the negative current flows through the coil L1.

While the positive current flows through the coil L1, the stator 210 is magnetized in the north pole, and the vibrator 220 receives a force toward the south pole of the permanent magnet 221 due to the magnetic force resulting from the north pole of the stator 210. With this force, the vibrator 220 is moved to a south pole side of the permanent magnet 221 against the spring 222a and is moved up to a contraction limit of the spring 222a. While no drive current flows through the coil L1, the stator 210 is not excited and therefore no magnetic force is produced. The vibrator 220 is moved to a center position due to the restoring force of the spring 222a. While the negative current flows through the coil L1, the stator 210 is magnetized in the south pole, and the vibrator 220 receives a force toward the north pole of the permanent magnet 221 due to the magnetic force resulting from the south pole of the stator 210. With this force, the vibrator 220 is moved to a north pole side of the permanent magnet 221 against the spring 222b and is moved up to a contraction limit of the spring 222b.

In this manner, the drive signal generating unit 10 controls the H-bridge circuit in a cycle of OFF state 4 ON-1 state→OFF state→ON-2 state→OFF state, and therefore the drive signal generating unit 10 can have the linear vibration motor 200 achieve the reciprocating motion.

As the H-bridge circuit transits from an ON-1 state to an OFF state and therefore the first transistor M1 to the fourth transistor M4 are all turned off, a regenerative current flows through the body diodes. As the H-bridge circuit transits from an ON-2 state to an OFF state, a regenerative current flows through the body diode, too. Making use of this regenerative current allows the energy efficiency to enhance and thereby allows the power consumed by the drive control circuit 100 to be reduced.

The regenerative current flows in the same direction as the direction of the current that has flowed through the coil L1 thus far. As the flow of the regenerative current has been completed, an induced current induced by the movement of the vibrator 220 now flows through the coil L1. While the vibrator 220 is at rest, this induced current does not flow. The state in which the vibrator 220 is at rest occurs at the instant the vibrator 20 has reached the both ends of a vibration range of the vibrator 220.

The induced voltage detector 30 can estimate the position of the vibrator 220 by monitoring an back-electromotive voltage occurring in the coil L1 during a nonconducting period. A zero state of the back-electromotive voltage indicates that the vibrator 220 is at rest (i.e., the vibrator 220 is located in a maximum reachable point at a south pole side or in a maximum reachable point at a north pole side).

Thus, the zero-cross detector 40 obtains the eigen frequency of the linear vibration motor 200 in such a manner that the zero-cross detector 40 detects the timing with which the voltage across the coil L1 (voltage between the point A and the point B) crosses zeros (except for the zero cross by the drive current and the regenerative current) and measures a period between the thus detected zero crosses. The period between continuous zero crosses indicate a half vibration cycle width, whereas the period between every other zero crossing indicates a full vibration cycle width.

According to the present embodiment, the zero-cross detector 40 detects only the timing with which the voltage across the coil L1 (voltage between the point A and the point B) crosses zero from a negative voltage to a positive voltage during a nonconducting period. In such a case, the comparator 41 as shown in FIG. 2 is set as follows. That is, the comparator 41 outputs a low-level signal while the output voltage of the op-amp OP1 is lower than the reference voltage Vref, whereas the comparator 41 outputs a high-level signal as the output voltage of the op-amp OP1 becomes higher than the reference voltage Vref.

Using the cycle width associated with the eigen frequency of the linear vibration motor 200 measured, the drive signal generating unit 10 adjusts the cycle width of the next drive signal. The measurement and the adjustment are repeated, so that the drive control circuit 100 can continuously drive the linear vibration motor 200 at its resonance frequency or a frequency in the neighborhood of the resonance frequency.

Referring back to FIG. 1, a more specific description is now given of the drive signal generating unit 10. The drive signal generating unit 10 includes a first latch circuit 11, a main counter 12, a loop counter 13, a decoder 14, a second latch circuit 15, a difference calculating circuit 16, a third latch circuit 17, an adder circuit 18, and a fourth latch circuit 19.

The first latch circuit 11 latches a count end value to be associated with an end position of each cycle of the drive signal, and outputs the count end value to the main counter 12 and the decoder 14 with the timing instructed by the third clock single CLK3. Note that the first latch circuit 11 may output the count end value to the difference calculating circuit 16 as well. An initial value of the count end value is set in the first latch circuit 11 by a not-shown register or the like at the start of driving the linear vibration motor 200. After the start of driving the linear vibration motor 200, a value inputted from the fourth latch circuit 19 is the count end value.

The main counter 12 repeatedly counts from a count initial value to the count end value wherein the count end value is set by the first latch circuit 11. "0" is generally set as the count initial value. For example, if "199" is set as the count end value, the main counter 12 will repeatedly count up from 0 to 199 therefore it will be a base-200 counter. The count value of the main counter 12 is outputted to the loop counter 13, the decoder 14 and the second latch circuit 15.

Every time a count loop of the main counter 12 ends, the loop counter 13 counts up by an increment of 1 and holds the number of count loops in the main counter 12. Here, a count loop indicates that the counting is done from the initial value of the main counter 12 up to the end value thereof. Each count loop corresponds to each drive cycle, so that the number of count loops corresponds to the number of drive cycles.

The decoder 14 generates a drive signal having a cycle width according to the count end value, using the count value supplied from the main counter 12. A detailed configuration of the decoder 14 will be described later. The second latch circuit 15 sequentially latches the count value supplied from the main counter 12, and outputs the count value latched in a position where the zero cross has been detected by the zero-cross detecting unit 40, to the difference calculating circuit 16. The position where the zero cross has been detected is conveyed by an edge signal inputted from the edge detector 42. If the position where the zero cross has been detected occurs always in the same timing, which is an ideal situation, the output of the second latch circuit 15 will always be the same count value.

The difference calculating circuit 16 calculates the difference between the count value inputted from the second latch circuit 15 and the present count end value. FIG. 1 illustrates an example where the present count end value is inputted from the first latch circuit 11. The difference calculating circuit 16 may be configured such that the difference calculating circuit 16 holds the present count end value or may be configured such that the present count end value is inputted from the fourth latch circuit 19.

If the count value in the position where the zero cross has been detected, namely the count value inputted from the second latch circuit 15, is less than the present count end value, the difference calculating circuit 16 will subtract the latter from the former. For example, if the count value in the position where the zero cross has been detected is "197" and the present count end value is "199", the difference calculating circuit 16 will output "−2".

If the count value in the position where the zero cross has been detected is greater than the present count end value, the count value inputted from the second latch circuit 15 will be an incremented value relative to the preset count end value. In this case, the difference calculating circuit 16 will output the count value inputted from the second latch circuit 15 as it is. For example, if the count value in the position where the zero cross has been detected is "201" and the present count end value is "199", the count value inputted from the second latch circuit 15 will be "2" and therefore the difference calculating circuit 16 will output 2 intact. Since the count value is reset at "199", the count value inputted from the second latch circuit 15 is not "201" but "2".

The third latch circuit 17 latches a difference value inputted from the difference calculating circuit 16, and outputs the difference value to the adder circuit 18 with the timing instructed by the first clock single CLK1. The adder circuit 18 adds the difference value inputted from the third latch circuit 17, to the present count end value inputted from the fourth latch circuit 19. The fourth latch circuit 19 latches a value inputted from the adder circuit 18 and outputs the value to the first latch circuit 11 with the timing instructed by the second clock single CLK2. An initial value of the count end value is set also in the fourth latch circuit 19 by the not-shown register or the like at the start of driving the linear vibration motor 200.

A value generated by the adder circuit 18 is set in the main counter 12 and the decoder 14 as a new count end value, via the fourth latch circuit 19 and the first latch circuit 11. Thus, a count end value that reflects the most recent detection position of zero cross is always set in the main counter 12 and the decoder 14.

Figure 4:
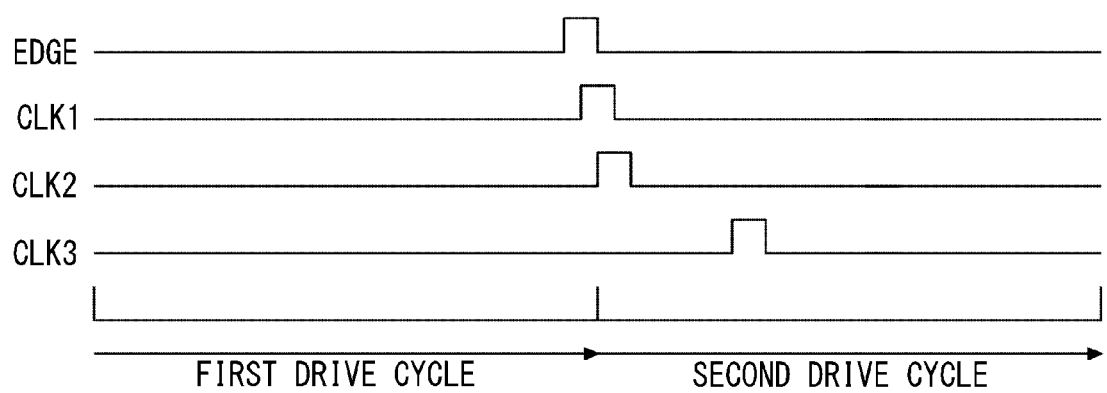
FIG. 4 is a timing chart showing an example of edge signal, first clock signal, second clock signal and third clock signal.

FIG. 4 is a timing chart showing an example of edge signal, first clock signal CLK1, second clock signal CLK2 and third clock signal CLK3. The edge signal is set in the second latch circuit 15 by the edge detector 42. The first clock signal CLK1 is a signal for which the edge signal is delayed by one-half clock. The delay of one-half clock is provided in consideration of arithmetic processings in the difference calculating circuit 16. The second clock signal CLK2 is a signal for which the first clock signal CLK1 is delayed by one-half clock. The delay of one-half clock is provided in consideration of arithmetic processings in the adder circuit 18.

The third clock signal CLK3 is a signal for which the second clock signal CLK2 is delayed by a several clocks. The delay of a several clocks is provided to suppress the count end value in the present drive cycle from being altered prior to the count end of the present drive cycle. Suppose, for example, that the first latch circuit 11 is not provided at all and that in the present drive cycle, a zero cross is detected before the end position. Then there is a possibility that a new count end value reflecting this zero cross position may be applied in the preset drive cycle instead of from the next drive cycle on. In such a case, a conducting period is determined based on the count end value which has not yet been updated, so that the ratio between the conducting period and the nonconducting period can no longer be maintained. In the present embodiment, the 100-degree conduction is no longer maintained.

The first latch circuit 11 is provided between the fourth latch circuit 19 and the main counter 12. Thus, the timing with which the present count end value set in the main counter 12 is updated to a new count end value reflecting the zero cross position can be delayed.

(Configuration of Decoder)

Figure 5:
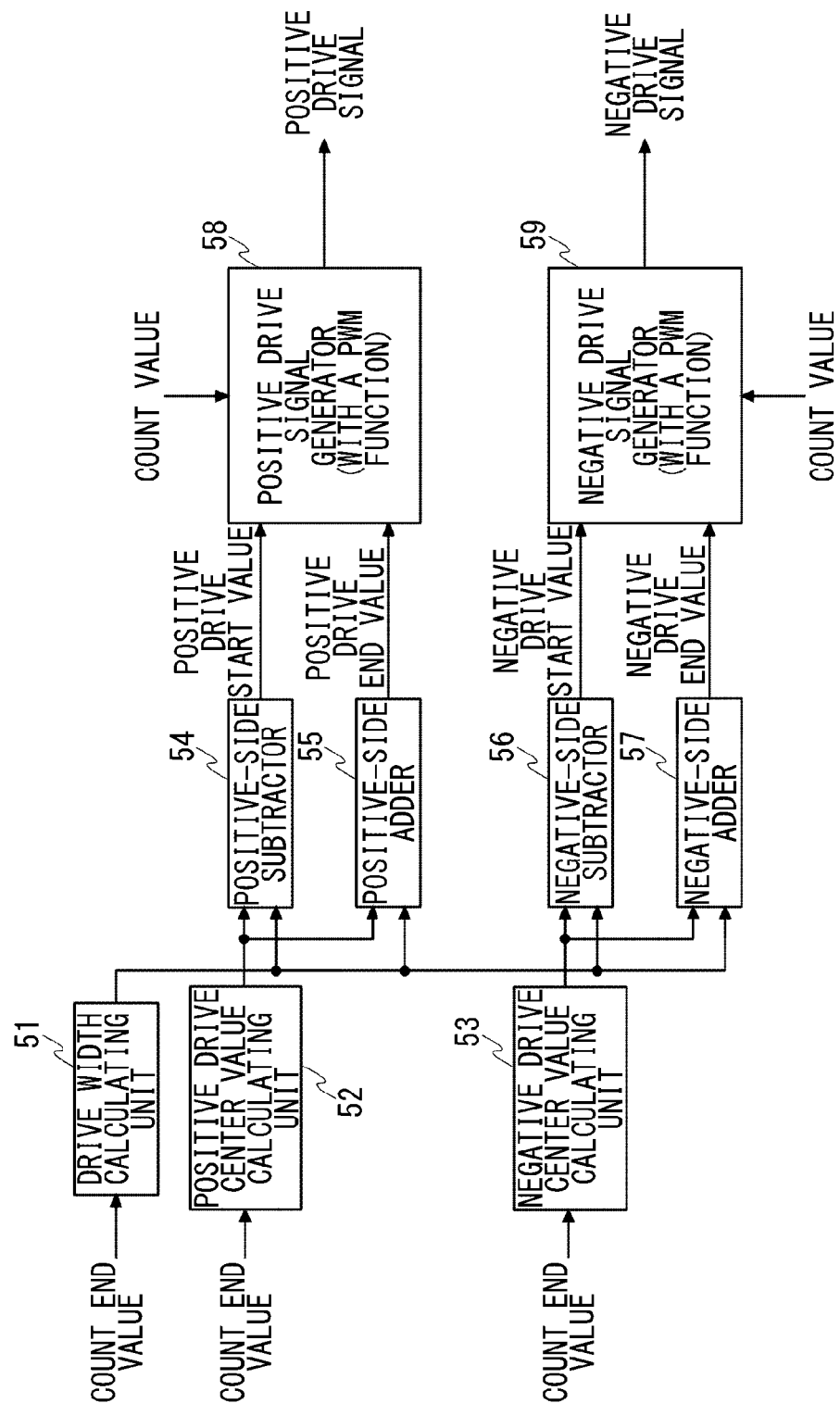
FIG. 5 shows an exemplary configuration of a decoder.

FIG. 5 shows an exemplary configuration of the decoder 14. The decoder 14 determines a count width corresponding to the conducting period of the drive signal, according to a value obtained after the count end value has been multiplied by a factor which is used to make the ratio of the conducting period over each cycle of the drive signal constant. As described above, each cycle of the drive signal contains a positive current conducting period and a negative current conducting period. Thus, in the case of the aforementioned 100-degree conduction, the ratio of each conducting period to a cycle of the drive signal is 100 degrees divided by 360 degrees, which is approximately 0.28 (100/360≈0.28). Also, the ratio of the half-period of each conducting period to a cycle of the drive signal is 50 degrees divided by 360 degrees, which is approximately 0.14 (50/360≈0.14).

Also, the decoder 14 determines count values corresponding to a start position and an end position of the conducting period of the drive signal, according to a value obtained after the count end value has been multiplied by a factor which is used to determine a center position of the conducting period of the drive signal. As described above, each cycle of the drive signal is formed by a positive current conducting period and a negative current conducting period wherein nonconducting periods are set before and after the positive current conducting period and also nonconducting periods are set before and after the negative current conducting period. The length of each positive current conducting period is the same as the length of each negative current conducting period; the length of each nonconducting period is set equally as well.

Thus, the factor which is used to determine the center position of the positive current conducting period of the drive signal is set to 0.25, whereas the factor which is used to determine the center position of the negative current conducting period of the drive signal is set to 0.75. Where the phase of the drive signal is opposite thereto, the factor which is used to determine the center position of the negative current conducting period of the drive signal is set to 0.25, and the factor which is used to determine the center position of the positive current conducting period of the drive signal is set to 0.75.

In this manner, the decoder 14 can calculate the count width corresponding to each conducting period and the count value corresponding to the center position of each conducting period. Then the value of one-half of the count width is subtracted from the count value corresponding to the center position, so that the count value corresponding to the start position of each conducting period can be calculated. Also, the value of one-half of the count width is added to the count value corresponding to the center position, so that the count value corresponding to the end position of each conducting period can be calculated.

A more specific description is now given hereunder. The decoder 14 includes a drive width calculating unit 51, a positive drive center value calculating unit 52, a negative drive center value calculating unit 53, a positive-side subtractor 54, a positive-side adder 55, a negative-side subtractor 56, a negative-side adder 57, a positive drive signal generator 58, and a negative drive signal generator 59.

The drive width calculating unit 51 holds the ratio of the half-period of each conducting period (hereinafter referred to as "drive period" also, as appropriate) to a cycle of the drive signal, as a factor. In the case of the aforementioned 100-degree conduction, the drive width calculating unit 51 stores "0.14" as the factor. A count end value is supplied to the drive width calculating unit 51 from the first latch circuit 11. The drive width calculating unit 51 multiplies the count end value by the factor. Thereby, a count width corresponding to the half-period of each drive period can be calculated.

The positive drive center value calculating unit 52 holds a factor which is used to determine the center position of a positive current conducting period of the drive signal (hereinafter referred to as "positive drive period" also, as appropriate). In the present embodiment, the positive drive center value calculating unit 52 stores "0.25" as the factor. A count end value is supplied to the positive drive center value calculating unit 52 from the first latch circuit 11. The positive drive center value calculating unit 52 multiplies the count end value by the factor. Thereby, a count value corresponding to the center position of each positive drive period can be calculated.

The negative drive center value calculating unit 53 holds a factor which is used to determine the center position of a negative current conducting period of the drive signal (hereinafter referred to as "negative drive period" also, as appropriate). In the present embodiment, the negative drive center value calculating unit 53 stores "0.75" as the factor. A count end value is supplied to the negative drive center value calculating unit 53 from the first latch circuit 11. The negative drive center value calculating unit 53 multiplies the count end value by the factor. Thereby, a count value corresponding to the center position of each negative drive period can be calculated.

The positive-side subtractor 54 subtracts the count width supplied from the drive width calculating unit 51, from the count value corresponding to the center position of the positive drive period supplied from the positive drive center value calculating unit 52, and thereby calculates a count value corresponding to the start position of the positive drive period. The positive-side adder 55 adds the count width supplied from the drive width calculating unit 51, to the count value corresponding to the center position of the positive drive period supplied from the positive drive center value calculating unit 52, and thereby calculates a count value corresponding to the end position of the positive drive period.

The negative-side subtractor 56 subtracts the count width supplied from the drive width calculating unit 51, from the count value corresponding to the center position of the negative drive period supplied from the negative drive center value calculating unit 53, and thereby calculates a count value corresponding to the start position of the negative drive period. The negative-side adder 57 adds the count width supplied from the drive width calculating unit 51, to the count value corresponding to the center position of the negative drive period supplied from the negative drive center value calculating unit 53, and thereby calculates a count value corresponding to the end position of the negative drive period.

Supplied to the positive drive signal generator 58 are (i) the count value, as a synchronous clock, from the main counter 12, (ii) the count value corresponding to the start position of the positive drive period, from the positive-side subtractor 54, and (iii) the count value corresponding to the end position of the positive drive period, from the positive-side adder 55. The positive drive signal generator 58 outputs a significant signal (e.g., a high-level signal) as a positive drive signal according to the count value as the synchronous clock, starting from the count value corresponding to the start positing of the positive drive period up to the count value corresponding to the end position of the positive drive period. The positive drive signal generator 58 outputs a nonsignificant signal (e.g., a low-level signal) in the other periods.

The positive drive signal generator 58 may generate the positive drive signal by using a PWM signal having a preset duty ratio. The positive drive signal generated by the positive drive signal generator 58 is inputted to the driver unit 20, namely the gate of the first transistor M1 and the gate of the fourth transistor M4. A not-shown inverter is provided at a stage prior to the first transistor M1, and the phase of the positive drive signal is inverted by this inverter and the thus inverted positive drive signal is inputted to the gate of the first transistor M1.

Supplied to the negative drive signal generator 59 are (i) the count value, as a synchronous clock, from the main counter 12, (ii) the count value corresponding to the start position of the negative drive period, from the negative-side subtractor 56, and (iii) the count value corresponding to the end position of the negative drive period, from the negative-side adder 57. The negative drive signal generator 59 outputs a significant signal (e.g., a high-level signal) as a negative drive signal according to the count value as the synchronous clock, starting from the count value corresponding to the start positing of the negative drive period up to the count value corresponding to the end position of the negative drive period. The negative drive signal generator 59 outputs a nonsignificant signal (e.g., a low-level signal) in the other periods.

The negative drive signal generator 59 may generate the negative drive signal by using a PWM signal having a preset duty ratio. The negative drive signal generated by the negative drive signal generator 59 is inputted to the driver unit 20, namely the gate of the second transistor M2 and the gate of the third transistor M3. A not-shown inverter is provided at a stage prior to the second transistor M2, and the phase of the negative drive signal is inverted by this inverter and the thus inverted negative drive signal is inputted to the gate of the second transistor M2.

Figure 6:
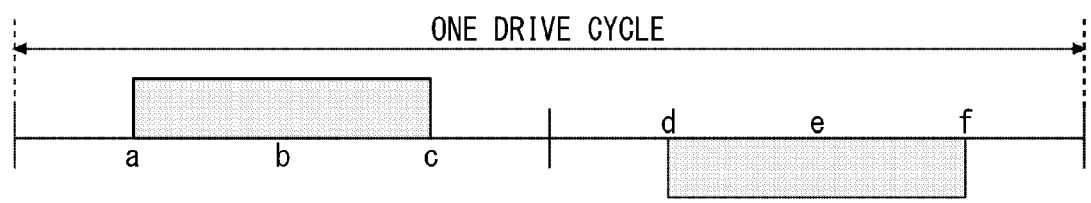
FIG. 6 shows a waveform of one cycle of drive signal.

FIG. 6 shows a waveform of one cycle of the drive signal. The shaded regions in FIG. 6 show a positive drive period (on the left) and a negative drive period (on the right). A count value corresponding to positive drive start value a is generated by the positive-side subtrator 54. A count value corresponding to positive drive center value b is generated by the positive drive center value calculating unit 52. A count value corresponding to positive end value c is generated by the positive-side adder 55. Similarly, a count value corresponding to negative drive start value d is generated by the negative-side subtrator 56. A count value corresponding to negative drive center value e is generated by the negative drive center value calculating unit 53. A count value corresponding to negative end value f is generated by the negative-side adder 57.

By configuring the decoder 14 as shown in FIG. 5, the drive signal generating unit 10 can adjust the drive signal in such a manner that the ratio between the conducting period and the nonconducting period can be maintained, even if the cycle width of the drive signal is altered by a change in the frequency of the drive signal. Also, the drive signal generating unit 10 can adjust the drive signal in such a manner that a relative positional relation of signal phase of the conducting period in each cycle can be maintained, even if the cycle width thereof is altered.

Figure 7A:
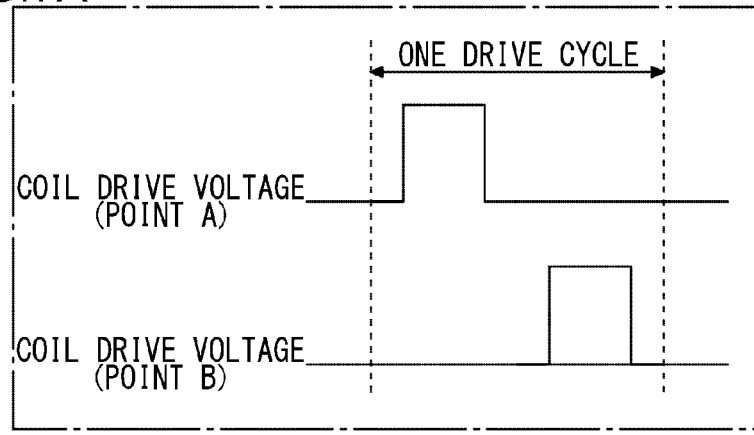
FIGS. 7A to 7C are illustrations for explaining how the width of a conducting period of drive signal is controlled.
Figure 7B:
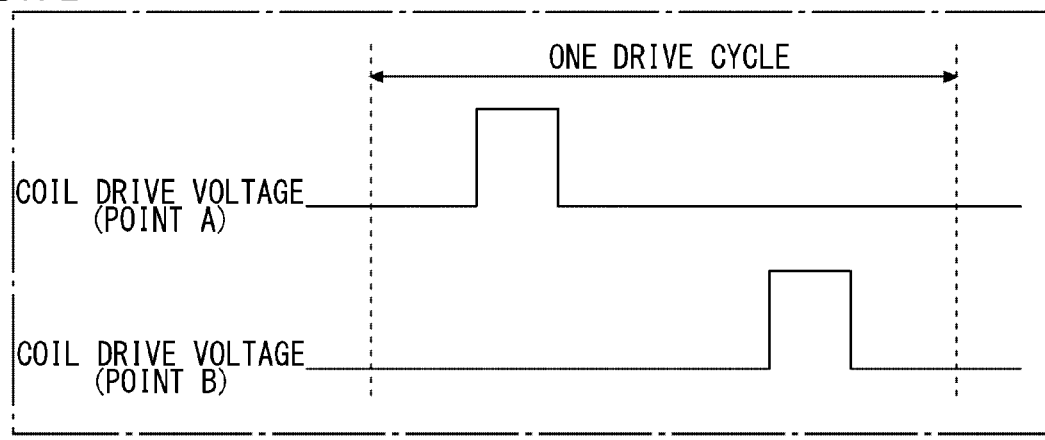
Figure 7C:
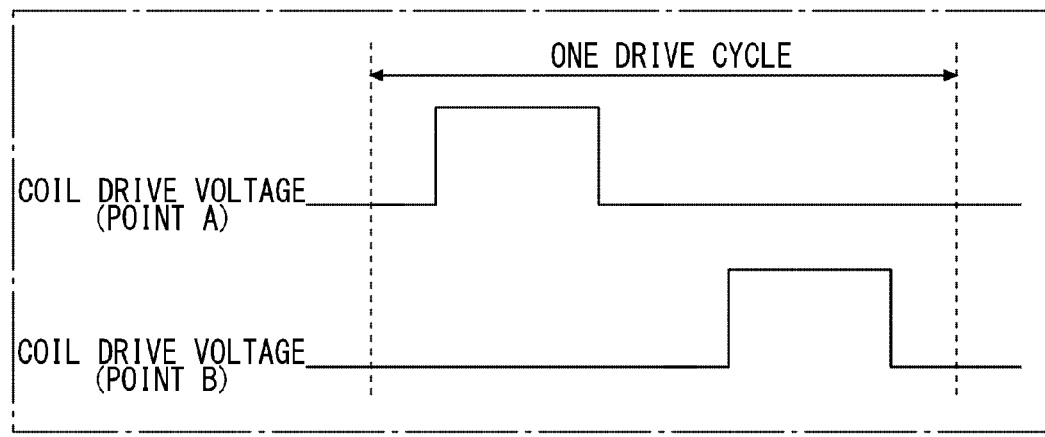

FIGS. 7A to 7C are illustrations for explaining how the width of the conducting period of drive signal is controlled. FIG. 7A shows a transition of coil derive voltage when the drive cycle is in a default state. FIG. 7B shows a transition of coil drive voltage (without the adjustment of the width of a conducting period) after the drive cycle has been adjusted to a longer drive cycle from the default state. FIG. 7C shows a transition of coil drive voltage (the width of a conducting period being adjusted) after the drive cycle has been adjusted to a longer drive cycle from the default state.

The aforementioned 100-degree conduction is set in FIG. 7A. In other words, the ratio of the conducting period and the nonconducting period is set to 5:4 in one drive cycle. FIG. 7B shows an example where the width of the conducting period is maintained even after the drive cycle has been adjusted to a longer drive cycle from the default state. In this case, the driving force for the linear vibration motor 200 drops, so that the vibration of the linear vibration motor 220 may weaken.

In FIG. 7C, control is performed such that the ratio of the conducting period and the nonconducting period is maintained in one drive cycle even after the drive cycle has been adjusted to a longer drive cycle from the default state. In the present embodiment, control is performed such that the 100-degree conduction is maintained. This control is achieved by the operation of drive width calculating unit 51 in the decoder 14.

Though a description has been given of an example where the drive cycle is adjusted to a longer drive cycle from the default state, the same applies to an example where the drive cycle is adjusted to a shorter drive cycle. If the width of the conducting period in the default state is maintained even after the drive cycle has been adjusted to a shorter drive cycle from the default state, the driving force for the linear vibration motor 200 rises, so that the vibration of the linear vibration motor 220 may get stronger. In the light of this, according the present embodiment, control is performed such that the 100-degree conduction is maintained, even after the drive cycle has been adjusted to a shorter drive cycle from the default state.

Figure 8:
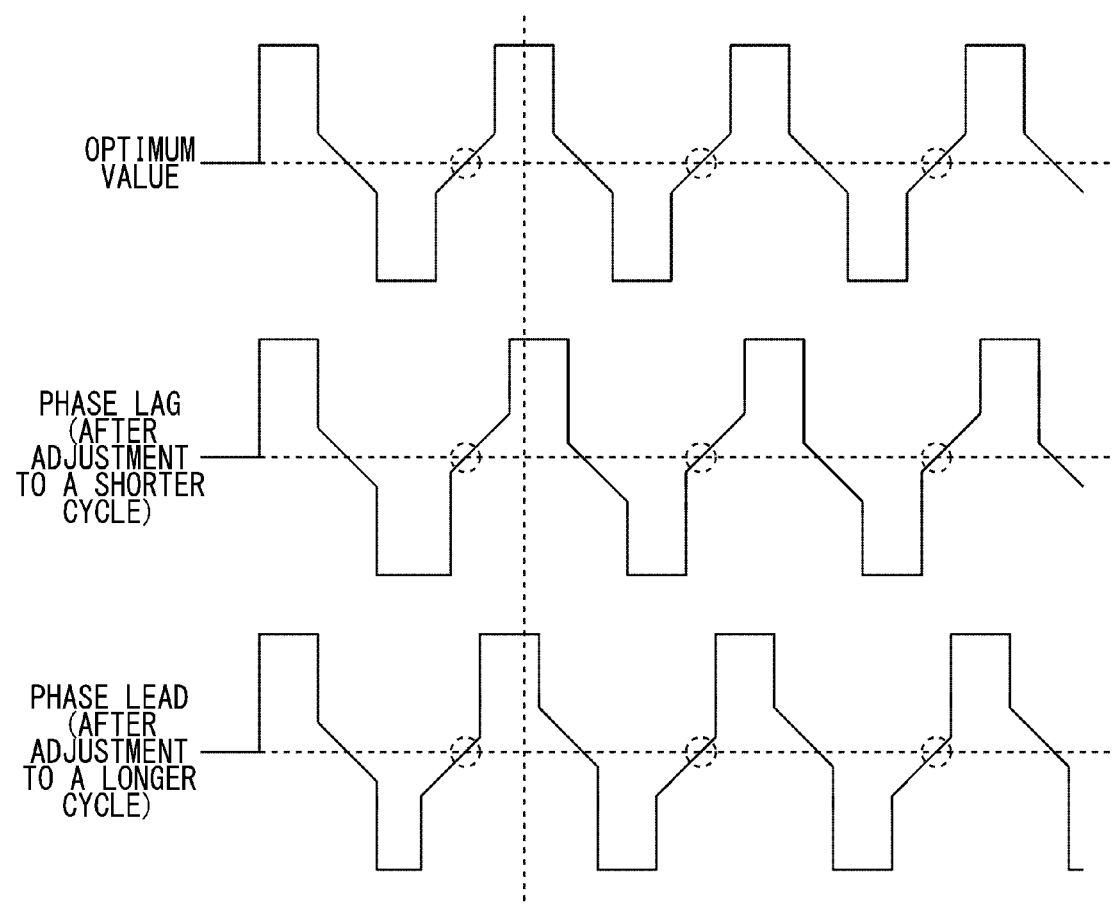
FIG. 8 is an illustration for explaining how the phase of drive signal is controlled.

FIG. 8 is an illustration for explaining how the phase of the drive signal is controlled. FIG. 8 shows transitions of voltage across the coil L1 after the resonance frequency of the linear vibration motor 200 has been adjusted. For simplicity of explanation, the regenerative voltage is omitted in FIG. 8. A waveform on the top row of FIG. 8 shows a state where the linear vibration motor 200 is driven in its optimum state.

A waveform on the middle row of FIG. 8 shows a state where the linear vibration motor 200 is driven in a state where the phase of the drive signal starts to lag the phase thereof on the top row from the second cycle onward. This state occurs when the drive cycle has been adjusted to a drive cycle shorter than before and when the start position and the end position of each conducting period are maintained even after the adjustment.

A waveform on the bottom row of FIG. 8 shows a state where the linear vibration motor 200 is driven in a state where the phase of the drive signal starts to lead the phase thereof on the top row from the second cycle onward. This state occurs when the drive cycle has been adjusted to a drive cycle longer than before and when the start position and the end position of each conducting period are maintained even after the adjustment.

That is, when the drive cycle width is varied while the start position and the end position of each conducting period are fixed, a phase lag or phase lead occurs in the drive signal. In contrast thereto, by employing the present embodiment, the start position and the end position of each conducting period are adaptively adjusted when the drive cycle is varied, so that the phase of the drive signal can be kept at the optimum condition. The adjustment of the start position and the end position is achieved mainly by the operations of the positive drive center value calculating unit 52 and the negative drive center value calculating unit 53 in the decoder 14.

As described above, by employing the drive control circuit 100 according to the present embodiment, the cycle width of the next drive signal is adjusted using a cycle width associated with the measured eigen frequency of the linear vibration motor 200. Hence, the linear vibration motor 200 can be continuously driven at a frequency as close to the eigen frequency thereof as possible under any circumstances.

Thus, the variations in the eigen frequencies among the manufactured products of linear vibration motors 200 can be absorbed and therefore the reduction in the yield in the case of the mass production of the linear vibration motors 200 can be prevented. Also, even if the springs 222a and 220b change in properties over time, the linear vibration motors 200 containing the springs 222a and 220b are driven at a drive frequency associated with the eigen frequency after such a temporal change, thereby suppressing the vibration from getting weak.

Also, when the cycle width of the drive signal is adaptively controlled in such a manner that the eigen frequency of the linear vibration motor 200 is made to agree with the frequency of the drive signal, the effect of the varied cycle width can be minimized. More specifically, even though the cycle width of the drive signal is varied, the width of the conducting period is adjusted in such a manner that the ratio of the conducting period and the nonconducting period in each cycle can be maintained, so that the driving force for the linear vibration motor 200 can be maintained.

Also, even though the cycle width of the drive signal is varied, the start position and the end position of each conducting period are adjusted to their optimum positions such that the relative positional relation in each cycle can be maintained. Thus, a drop in drive efficiency can be suppressed. In other words, when the phase of the drive signal is shifted, a displacement occurs between the position of the vibrator 220 and the position where the driving force is supplied. As a result, the drive efficiency drops. In the light of this, the phase of the drive signal is kept at its optimum position, so that the maximum vibration can be produced with the same power consumption.

(Rise Control)

A description is given hereunder of a first rise control, which may be added to the above-described drive control, performed by the drive control circuit 100 according to the present embodiment. As already shown in FIG. 6, one cycle of the drive signal is formed by a positive current conducting period and a negative current conducting period wherein nonconducting periods are set before and after the positive current conducting period and also nonconducting periods are set before and after the negative current conducting period. As a result, the zero crosses of the induced voltage can be detected with accuracy as already shown in FIG. 3 and the drive efficiency can be enhanced as already shown in FIG. 8.

Thus, it is a general rule that a nonconducting period is also set before the positive current conducting period of the first cycle in the drive signal; in the case of the opposite phase, it is set before the negative current conducting period. Note that this nonconducting period works in such a direction as to delay a rise time. In order to improve this, the drive signal generating unit 10 can perform control as follows.

That is, the drive signal generating unit 10 sets the width of a nonconducting period such that, after the start of driving the linear vibration motor 200, the width of a nonconducting period to be set before at least the first conducting period of the drive signal is shorter than the width of a nonconducting period to be set before each conducting period during steady operation of the linear vibration motor 200. For example, after the start of driving the linear vibration motor 200, the drive signal generating unit 10 may set the width of a nonconducting period to be set before at least the first conducting period of the drive signal, to zero.

A conducting period, before which a nonconducting period whose width is shorter than that of a nonconducting period to be set before each conducting period during steady operation, may be the first conducting period only or it may be a first conducting period to an nth conducting period (n being a natural number). In the latter case, the width of each nonconducting period to be set before each of the first conducting period to the nth conducting period may be set longer as it approaches the nth conducing period from the first conducting period.

While a nonconducting period whose width is shorter than that of a nonconducting period to be set before each conducting period during steady period is set before a conducting period, the drive signal generating unit 10 may stop a process of adjusting the cycle width of the drive signal. In such a case, the process of detecting the zero cross of the induced voltage performed by the induced voltage detector 30 and the zero-cross detecting unit 40 may be stopped.

Next, a description is given of a second rise control, which may be added to the above-described drive control, performed by the drive control circuit 100 according to the present embodiment. As already shown in FIG. 5, the drive signal generating unit 10 can generate the signal of each conducting period by using a PWM signal. Thereby, the drive capacity can be adjusted according to the performance of the linear vibration motor 200.

As a precondition in the second rise control, the signal of each conducting period is generated using a PWM signal. The drive signal generating unit 10 sets the duty ratio of PWM signal such that, after the start of driving the linear vibration motor 200, the duty ratio of PWM signal generated in at least the first conducting period of the drive signal is higher than the duty ratio of PWM signal generated in each conducting period during steady operation of the linear vibration motor 200. For example, after the start of driving the linear vibration motor 200, the drive signal generating unit 10 may set the duty ratio of PWM signal generated in at least the first conducting period of the drive signal, to "1".

A conducting period, in which a PWM signal whose duty ratio is higher than the duty ratio of PWM signal generated in each conducting period during steady operation, may be the first conducting period only or it may be a first conducting period to an mth conducting period (m being a natural number). In the latter case, the duty ratio of PWM signal generated in each conducting period may be lowered as it approaches the mth conducing period from the first conducting period.

While a PWM signal whose duty ratio is higher than the duty ratio of PWM signal generated in each conducting period during steady operation is generated, the drive signal generating unit 10 may stop a process of adjusting the cycle width of the drive signal. In such a case, the process of detecting the zero cross of the induced voltage performed by the induced voltage detector 30 and the zero-cross detecting unit 40 may be stopped.

The first rise control and the second rise control may be performed independently or in combination. A description is given hereunder of an exemplary configuration of the decoder 14 when at least one of the first rise control and the second rise control is performed.

Figure 9:
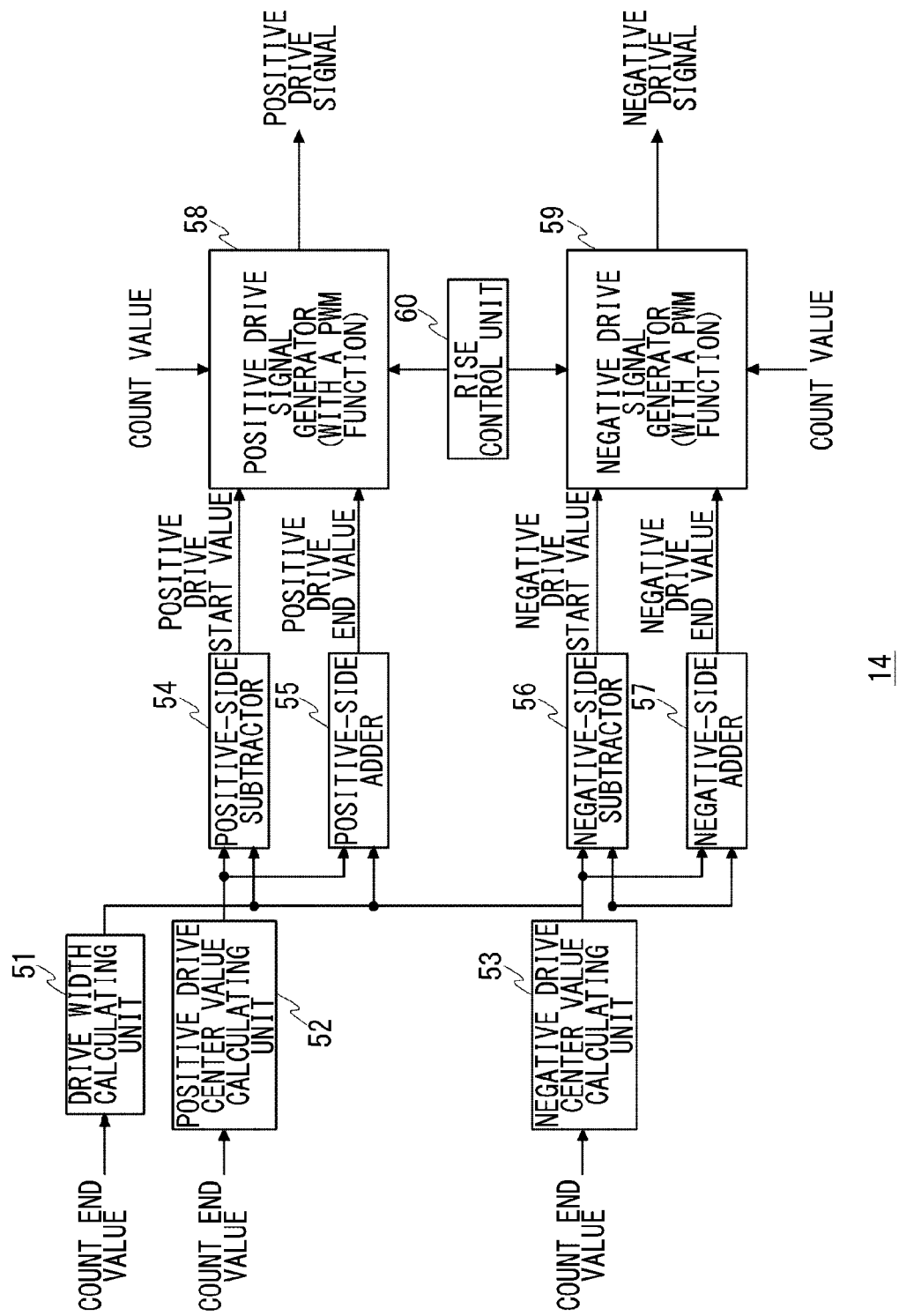
FIG. 9 shows an exemplary configuration of a decoder where a rise control function is added.

FIG. 9 shows an exemplary configuration of a decoder 14 where a rise control function is added. The decoder 14 shown in FIG. 9 is configured such that a rise control unit 60 is added to the decoder 14 of FIG. 5. When the first rise control is to be performed, the rise control unit 60 corrects the count value inputted from the main counter 12 to the positive drive signal generator 58 and the negative drive signal generator 59.

For example, if the width of a nonconducting period to be set before a conducting period is set to zero, the rise control unit 60 will add the count width corresponding to the width of a nonconducting period to be set before each conducting period during steady operation, to the count value inputted from the main counter 12. As a result, the positive drive signal generator 58 and the negative drive signal generator 59 can omit the nonconducting periods to be set before the positive current conducting period and the negative current conducting period, respectively.

It is to be noted here that the similar process can also be carried out if, during a period in which the width of a nonconducting period to be set before a conducting period is set to zero, the count initial value of the main counter 12 is set to a value which is a count initial value, during a steady operation period, added with the above-described count width. In the present embodiment, the count initial value of the main counter 12 is set to a count value at the start of the 100-degree conduction. This process may be carried out by not-shown another rise control unit which is not included in the decoder 14.

When the second rise control is to be performed, the rise control unit 60 sets the duty ratio of PWM signal generated in at least the first conducting period of the drive signal, to the positive drive signal generator 58 and the negative drive signal generator 59. In so doing, a duty ratio higher than the duty ratio of PWM signal generated in each conducting period during steady operation is set.

Figure 10A:
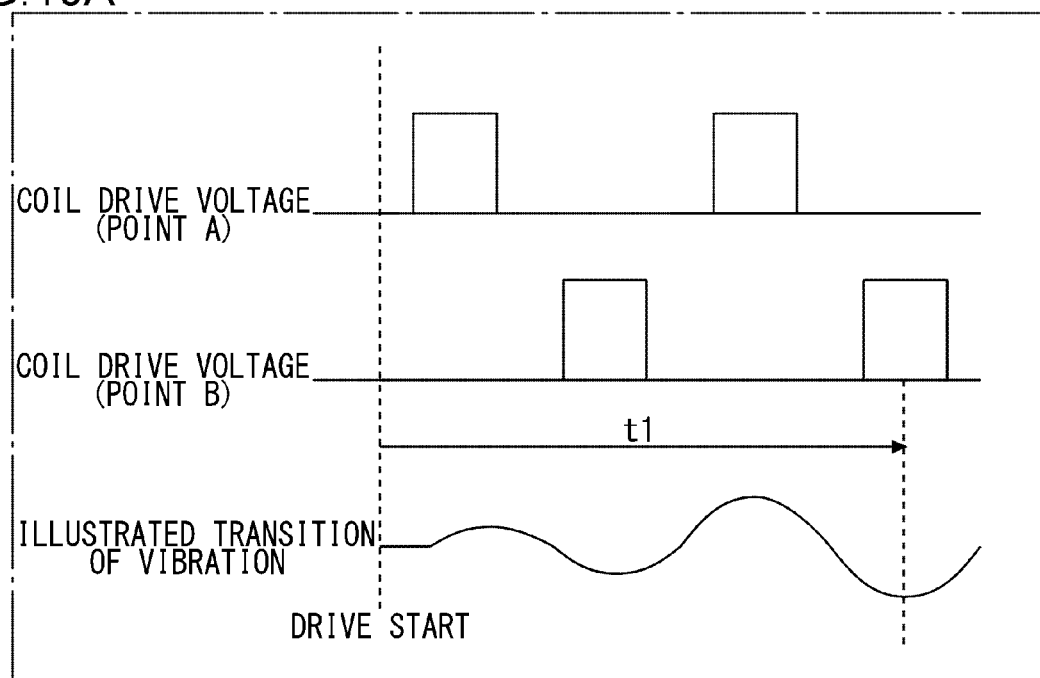
FIGS. 10A and 10B are illustrations for explaining a first rise control.
Figure 10B:
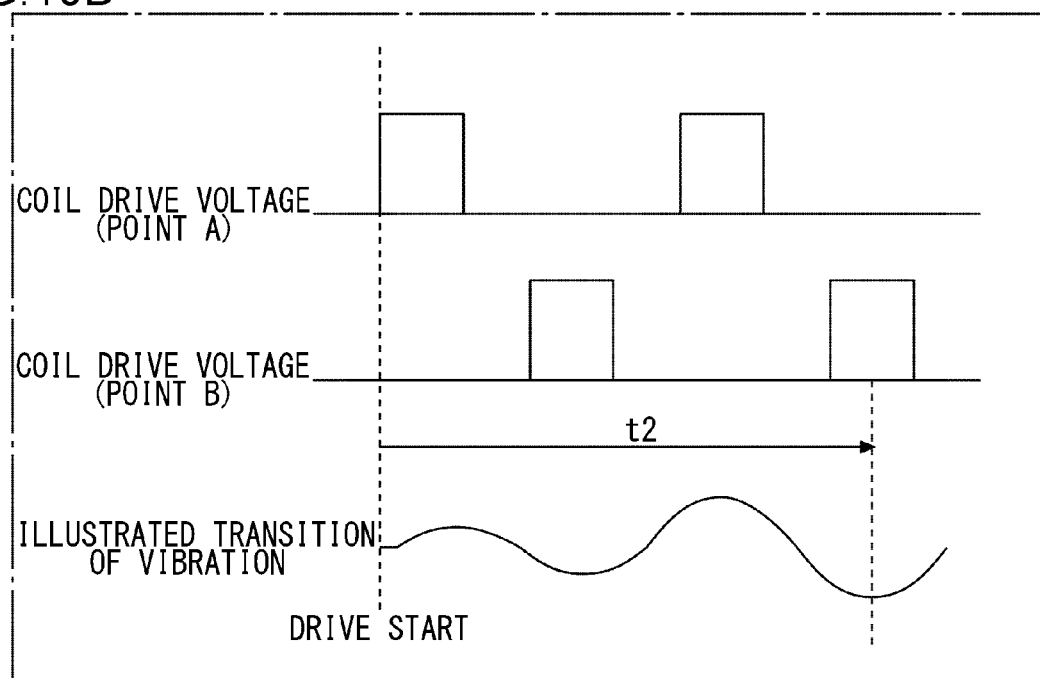

FIGS. 10A and 10B are illustrations for explaining the first rise control. FIG. 10A shows the transitions of coil drive voltages and vibration level of the linear vibration motor 200 when the first rise control is not performed. FIG. 10B shows the transitions of coil drive voltages and vibration level of the linear vibration motor 200 when the first rise control is performed.

FIG. 10A and FIG. 10B show examples where the vibration of the linear vibration motor 200 reaches a desired level (i.e., the level during steady operation) in the second cycle of the drive signal. In FIG. 10B, the drive signal generating unit 10 sets the width of a nonconducting period to be set before the first conducting period of the drive signal to zero.

A period t1 in FIG. 10A indicates a time length from a drive start time to an instant at which the vibration reaches a desired level, when the first rise control is not performed. A period t2 in FIG. 10B indicates a time length from a drive start time to an instant at which the vibration reaches a desired level, when the first rise control is performed. Comparing the period t1 with the period t2, the period t2 is shorter. It is apparent therefore that the period of time that takes from the drive start time to the instant at which the vibration reaches the desired level can be reduced by performing the first rise control.

Figure 11A:
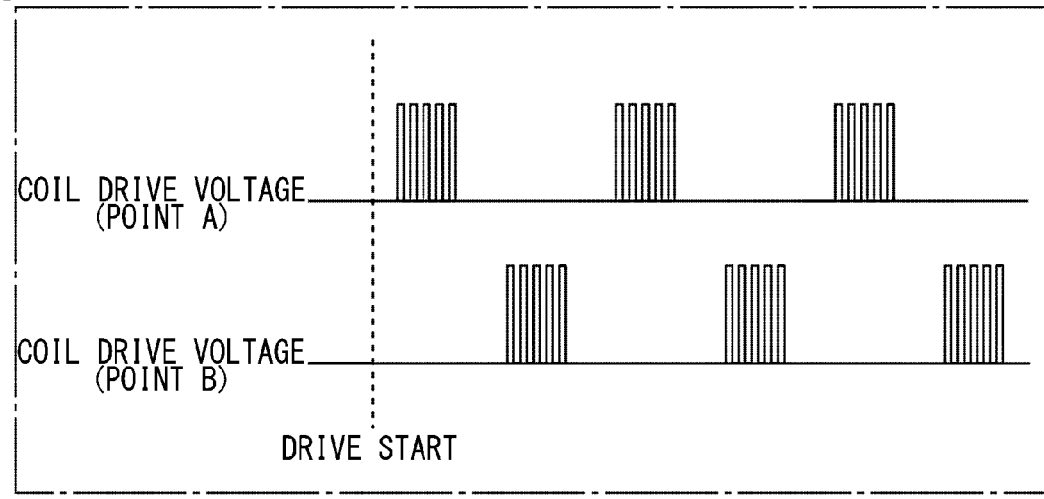
FIGS. 11A and 11B are illustrations for explaining a second rise control.
Figure 11B:
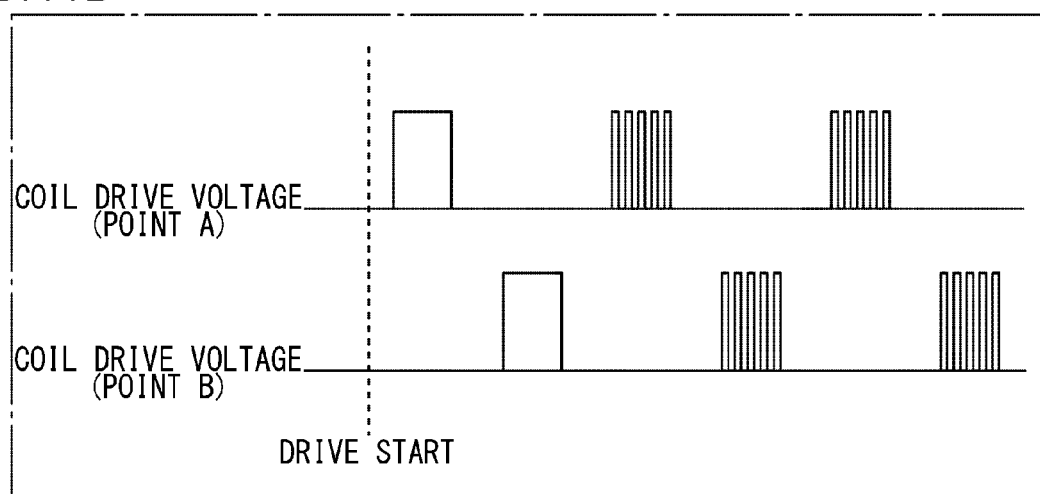

FIGS. 11A and 11B are illustrations for explaining the second rise control. FIG. 11A shows the transition of coil drive voltages when the second rise control is not performed. FIG. 11B shows the transition of coil drive voltages when the second rise control is performed. In FIG. 11A, after the drive start, the drive signal generating unit 10 generates the signal of each conducting period by using PWM signals, starting from the signal of the first conducting period onward. In FIG. 11B, after the drive start, the drive signal generating unit 10 generates the signal of the first conducting period by using a non-PWM signal and generates the signal of each conducting period after the second cycle by using PWM signals.

As described above, the length of time that takes from the drive start to the energization of the coil L1 can be reduced by employing the first rise control. Thus, the rise time that takes from the drive start of the linear vibration motor 200 to the instant at which the vibration reaches the desired level can be reduced. Also, the driving force at the rise time can be made higher than that during steady operation by employing the second rise control. Thus, the rise time can be shortened.

(Stop Control)

A description is given hereunder of a stop control, which may be added to the above-described drive control, performed by the drive control circuit 100 according to the present embodiment. After the drive termination of the linear vibration motor 200, the drive signal generating unit 10 generates a drive signal whose phase is opposite to the phase of the drive signal generated during the motor running. The driver unit 20 supplies the drive current of opposite phase according to the drive signal of opposite phase generated by the drive signal generating unit 10, to the coil L1. This quickens the stop of the linear vibration motor 200. As the drive current of opposite phase is supplied to the coil L1, the stator 210 achieves a braking function to stop the motion of the vibrator 220. In this patent specification, the drive termination of the linear vibration motor 200 means a normal drive stop excluding the reverse drive period required for the stop control.

The drive signal generating unit 10 may generate the signal of each conducting period for the drive signal of opposite phase generated after the drive termination of the linear vibration motor 200, by using a PWM signal. A braking force can be adjusted flexibly by adjusting the duty ratio of this PWM signal.

As described above, the drive signal generating unit 10 can generate the signal of each conducting period by using the PWM signal. If it is assumed that the signal of each conducting period is generated by using the PWM signal, the drive signal generating unit 10 can employ the following stop control. In other words, the drive signal generating unit 10 may set the duty ratio of PWM signal such that the duty ratio of PWM signal generated in a conducting period of the drive signal of opposite phase after the drive termination of the linear vibration motor 200 is lower than the duty ratio of PWM signal generated in each conducting period of the drive signal during the linear vibration motor 200 running.

The drive signal generating unit 10 may adjust the supply period of the drive signal of opposite phase after the drive termination of the linear vibration motor 200 according to the supply period of the drive signal during the linear vibration motor 200 running. For example, the drive signal generating unit 10 sets the supply period in such a manner that the shorter the supply period of the drive signal during the motor running is, the shorter the supply period of the drive signal of opposite phase after the drive termination is set. For example, the supply period of the drive signal of opposite phase is set proportional to the supply period of the drive signal during motor running. If the supply period of the drive signal during the motor running is in a range exceeding a reference period, the supply period of the drive signal of opposite phase may be fixed. Note that the supply period of the drive signal can be identified by the number of drive cycles.

The drive signal generating unit 10 may adjust the duty ratio of PWM signal generated in a conducting period of the drive signal of opposite phase after the drive termination of the linear vibration motor 200, according to the supply period of the drive signal during the linear vibration motor 200 running. For example, the drive signal generating unit 10 sets the duty ratio of the PWM signal in such a manner that the shorter the supply period of the drive signal during the motor running is, the lower the duty ratio of the PWM signal is set. For example, the duty ratio of the PWM signal is set proportional to the supply period of the drive signal during motor running. If the supply period of the drive signal during the motor running is in a range exceeding a reference period, the duty ratio of the PWM signal may be fixed.

Figure 12:
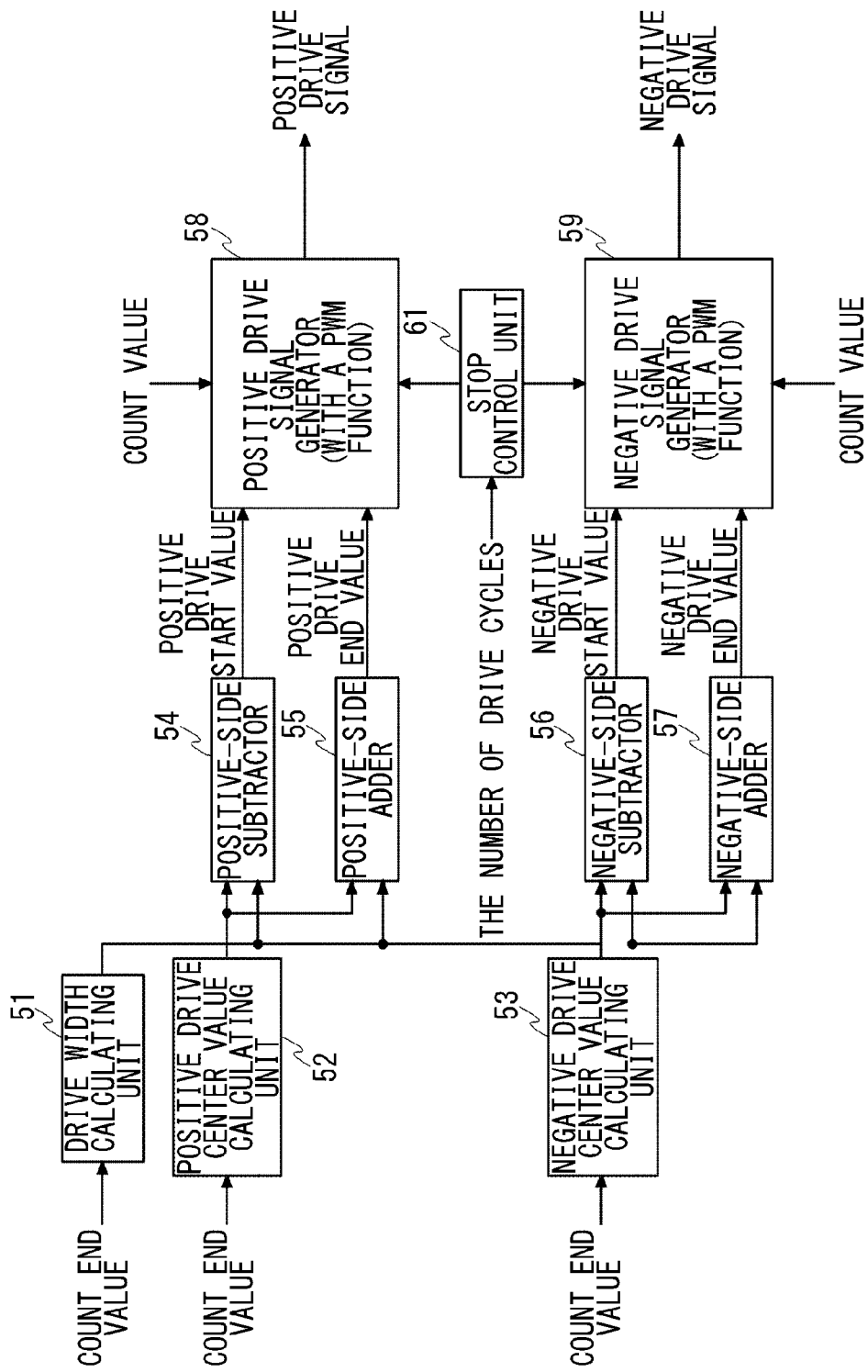
FIG. 12 shows an exemplary configuration of a decoder where a stop control function is added.

FIG. 12 shows an exemplary configuration of a decoder 14 where a stop control function is added. The decoder 14 shown in FIG. 12 is a configuration of the decoder 14 shown in FIG. 5 added with a stop control unit 61. When the drive of the linear vibration motor 200 is terminated, the stop control unit 61 instructs the positive drive signal generator 58 and the negative drive signal generator 59 to generate a drive signal whose phase is opposite to the phase of the drive signal generated while the linear vibration motor 200 is running. In such a case, the stop control unit 61 may instruct the positive drive signal generator 58 and the negative drive signal generator 59 to generate a conducting period of the drive signal of opposite phase by use of PWM signals.

If the supply period of the drive signal of opposite phase is to be adjusted according to the supply period of the drive signal during the linear vibration motor 200 running, the stop control unit 61 receives the supply of the number of count loops (i.e., the number of drive cycles) from the loop counter 13. The stop control unit 61 instructs the positive drive signal generator 58 and the negative drive signal generator 59 to generate the drive signal of opposite phase reflecting the number of drive cycles. The same applies to the case where the duty ratio of the PWM signal is adjusted according to the supply period of the drive signal during the linear vibration motor 200 running.

Figure 13A:
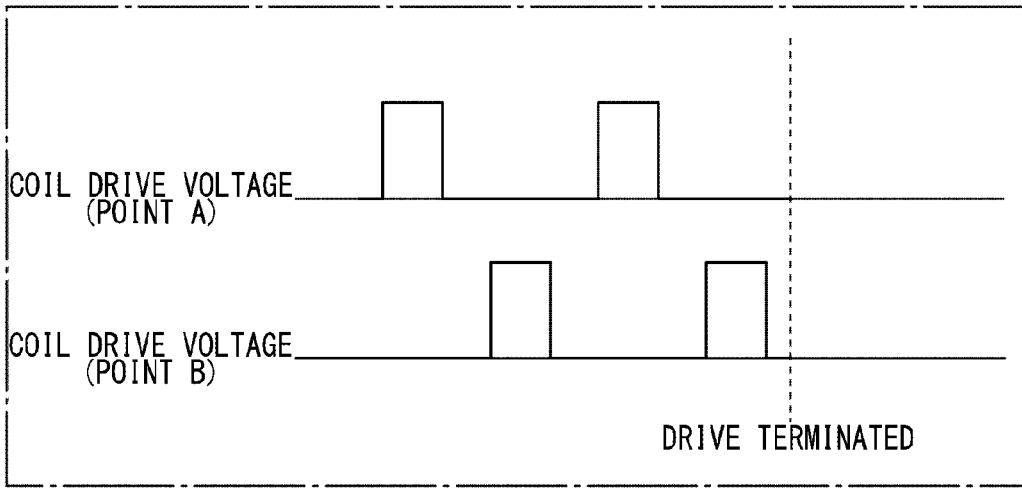
FIGS. 13A, 13B and 13C are illustrations for explaining a basic concept of a stop control.
Figure 13B:
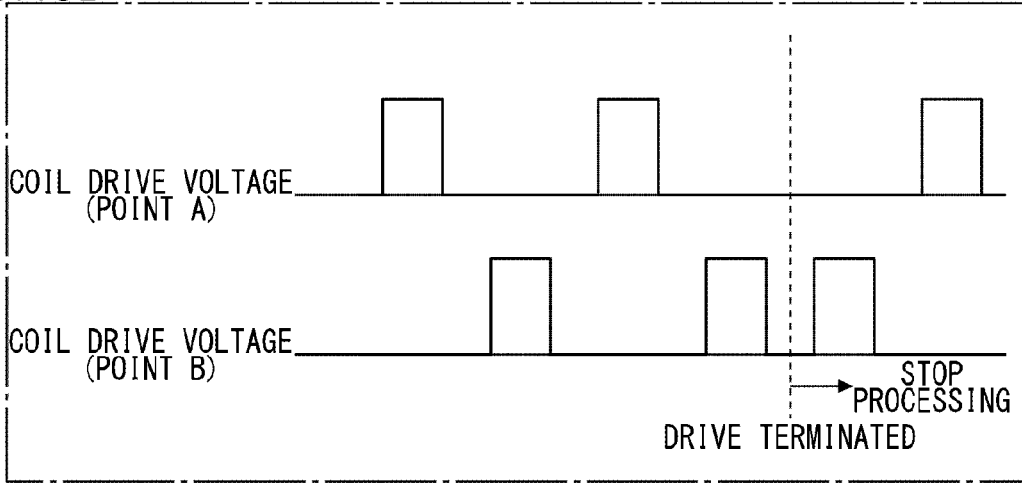
Figure 13C:
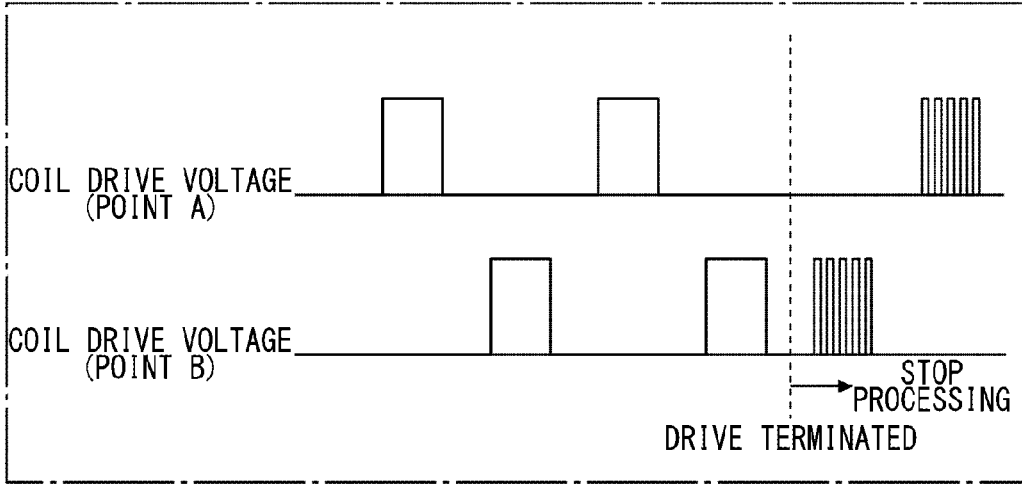

FIGS. 13A, 13B and 13C are illustrations for explaining a basic concept of the stop control. FIG. 13A shows the transition of coil drive voltages when the stop control is not performed. FIG. 13B shows the transition of coil drive voltages when the stop control is performed. FIG. 13C shows the transition of coil drive voltages when the stop control is performed using PWM signals.

In the examples shown in FIG. 13B and FIG. 13C, the number of cycles for the drive signal of opposite phase after the drive termination is one but it may be a plurality of times. If the number of cycles is a plurality of times and the signal of a conducting period of the drive signal is generated by using PWM signals, the duty ratio of the PWM signal may be lowered as the cycle of the drive signal of opposite phase advances.

Figure 14A:
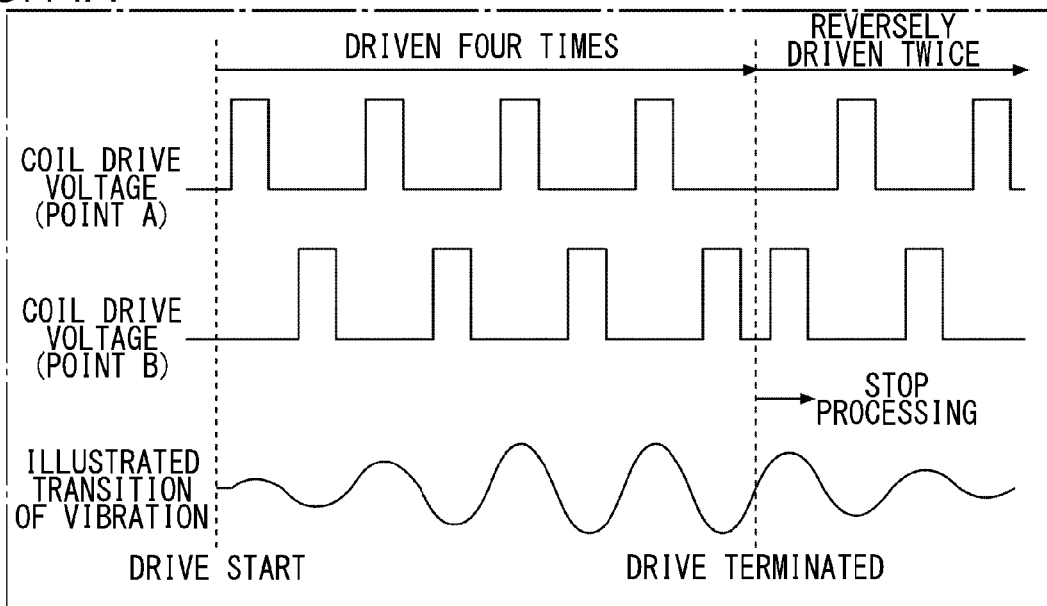
FIGS. 14A and 14B are illustrations for explaining examples where the number of cycles for a drive signal of opposite phase is fixed in the stop control.
Figure 14B:
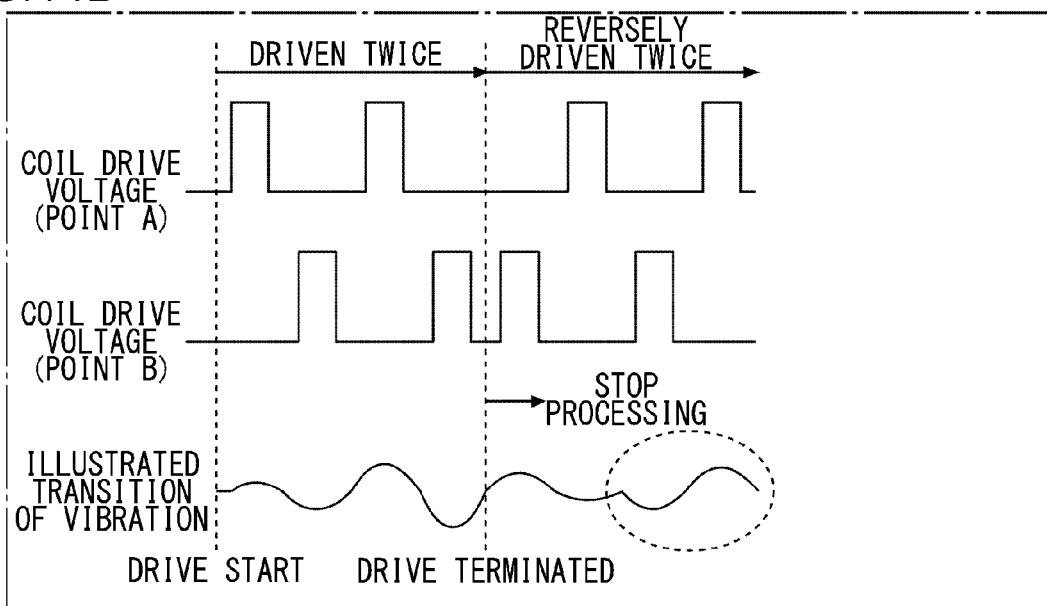

FIGS. 14A and 14B are illustrations for explaining examples where the number of cycles for the drive signal of opposite phase is fixed in the stop control. FIG. 14A shows the transitions of coil drive voltages and vibration level of the linear vibration motor 200 when the number of cycles for the drive signal during the motor running is large. FIG. 14B shows the transitions of coil drive voltages and vibration level of the linear vibration motor 200 when the number of cycles for the drive signal during the motor running is small.

FIGS. 14A and 14B show examples where the number of cycles for the drive signal of opposite phase generated after the drive termination is fixed to "2". FIG. 14A shows an example where the number of cycles for the drive signal during motor running is "4", whereas FIG. 14B shows an example where the number of cycles for the drive signal during the motor running is "2". As can be seen from FIG. 14A, supplying the drive signal of opposite phase to the coil L1 for two cycles allows the vibration of the linear vibration motor 200 to converge faster after the drive termination of the linear vibration motor 200.

On the other hand, as shown in FIG. 14B, although supplying the drive signal of opposite phase to the coil L1 for two cycles allows the vibration of the linear vibration motor 200 to converge faster after the drive termination of the linear vibration motor 200, a vibration of opposite phase occurs (see the curve surrounded by a dotted ellipse). This means that an excessive braking force is applied to the vibration during the linear motor 200 running.

Figure 15A:
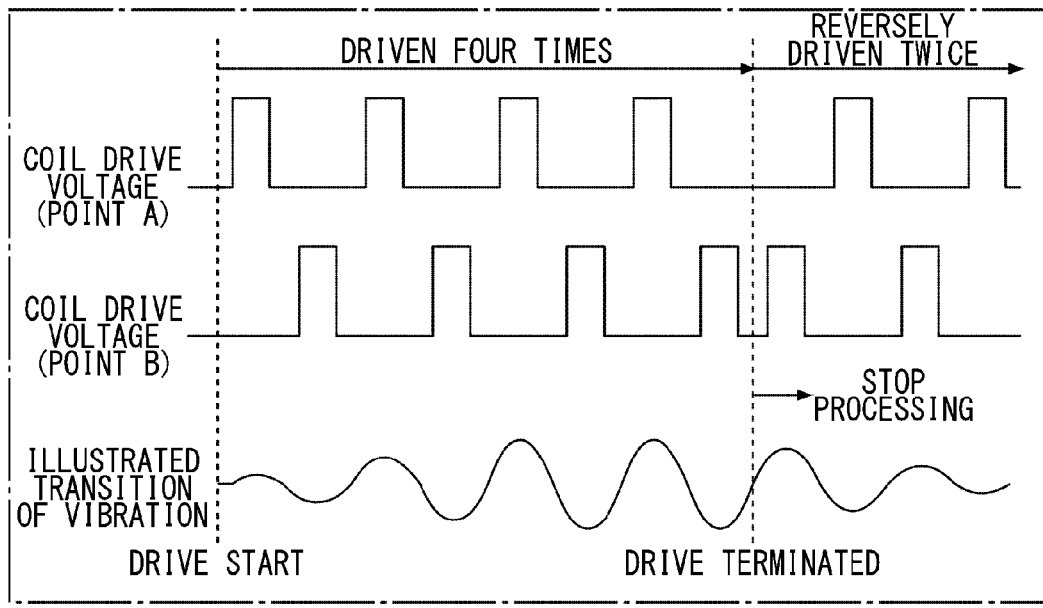
FIGS. 15A and 15B are illustrations for explaining examples where the number of cycles for a drive signal of opposite phase is variable in the stop control.
Figure 15B:
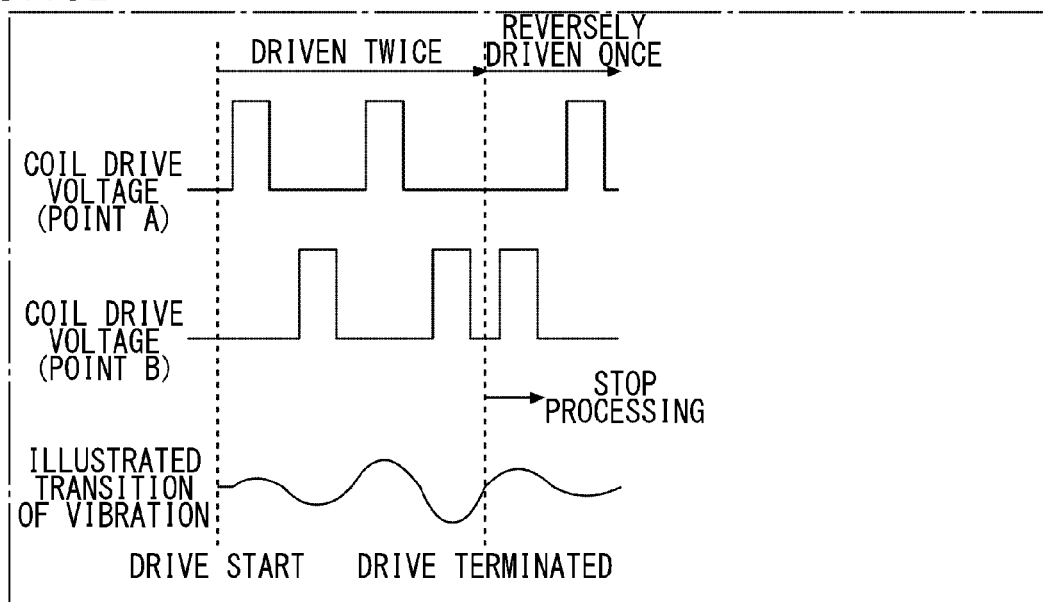

FIGS. 15A and 15B are illustrations for explaining examples where the number of cycles for the drive signal of opposite phase is variable in the stop control. FIG. 15A shows the transitions of coil drive voltages and vibration level of the linear vibration motor 200 when the number of cycles for the drive signal during the motor running is large. FIG. 15B shows the transitions of coil drive voltages and vibration level of the linear vibration motor 200 when the number of cycles for the drive signal during the motor running is small.

FIG. 15A is the same as FIG. 14A. FIG. 15B shows an example where the number of cycles for the drive signal during the motor running is "2" and the number of cycles for the drive signal of opposite phase generated after the drive termination is "1". As can be seen from FIG. 15B, supplying the drive signal of opposite phase to the coil L1 for one cycle allows the vibration of the linear vibration motor 200 to converge faster after the drive termination of the linear vibration motor 200. As compared with the FIG. 14B, the vibration of opposite phase does not occur in FIG. 15B.

In FIGS. 14A and 14B, a fixed braking force is supplied while the strength of vibration of the linear vibration motor 200 before the drive termination of the linear vibration motor 200 is not taken into account. As a result, the braking force may be excessive or insufficient. To cope with this problem, an optimum stop control can be achieved in FIGS. 15A and 15B by supplying a braking force reflecting the strength of vibration of the linear vibration motor 200.

As described above, the length of time that takes from the drive stop of the linear vibration motor 200 to the complete stop of the vibration thereof can be reduced by employing the above-described stop control. Also, the signal of a conducting period for the drive signal of opposite phase is generated by using a PWM signal, so that the braking force can be set flexibly. Also, the supply period of the drive signal of opposite phase is adjusted according to the supply period of the drive signal during the linear drive motor 200 running. Thus, the optimum stop control can be achieved independently of whether the supply period of the drive signal during the motor running is long or short. In the use of haptics, the user can easily feel the vibration through the touch of sense if the vibration level is changed precipitously. The vibration can be changed precipitously by employing the above-described stop control.

(The Setting of Detection Window)

A description is next given of an example where the zero-cross detecting unit 40 sets a detection window for avoiding the detection of zero crosses of voltages other than the induced voltage. The zero-cross detecting unit 40 enables the zero crosses detected within the detection window and disables those detected outside the detection window. Here, the zero crosses of voltages other than the induced voltages are mainly the zero crosses of drive voltage delivered from the drive signal generating unit 10 and those of regenerative voltage (see FIG. 3). Thus, the detection window is basically set in a period which lies within (inwardly) and is narrower than a nonconducting period set between a positive (negative) current conducting period and a negative (positive) current conducing period.

In the setting of the detection window, a period during which at least the regenerative current flows from this non-conducting period must be excluded. Caution must be exercised, however, that there is a possibility that the proper zero cross of the induced voltage cannot be detected if the detection window is too narrow. In the light of this, the duration (width) of a detection window is determined in consideration of a trade-off relation between the possibility that the zero crosses of voltages other than the induced voltage are detected and the possibility that those of the regular induced voltage cannot be detected.

A description is now given of a case where the zero cross is not detected within the detection window. In this case, if the zero cross of the induced voltage has already been completed at a start position of the detection window, the zero-cross detecting unit 40 will first assume that the zero cross has been detected in the neighborhood of the start position of the detection window and then supply the assumed detection position of the zero cross to the drive signal generating unit 10. The case where the zero cross of the induced voltage has already been completed at a start position of the detection window means that the voltage across the coil L1 is of a polarity after the zero cross in the start position of the detection window. In the example of FIG. 3, the voltage across the coil L1 is positive in the start position of the detection window.

Also, if the zero cross is not detected within the detection window and if the zero cross of the induced voltage has not yet been completed at an end position of the detection window, the zero-cross detecting unit 40 will first assume that the zero cross has been detected in the neighborhood of the end position of the detection window and then supply the assumed detection position of the zero cross to the drive signal generating unit 10. The case where the zero cross of the induced voltage has not yet been completed at an end position of the detection window means that the voltage across the coil L1 is of a polarity before the zero cross in the end position of the detection window. A description is given hereunder of an exemplary configuration of the zero-cross detecting unit 40 to realize these processings.

Figure 16:
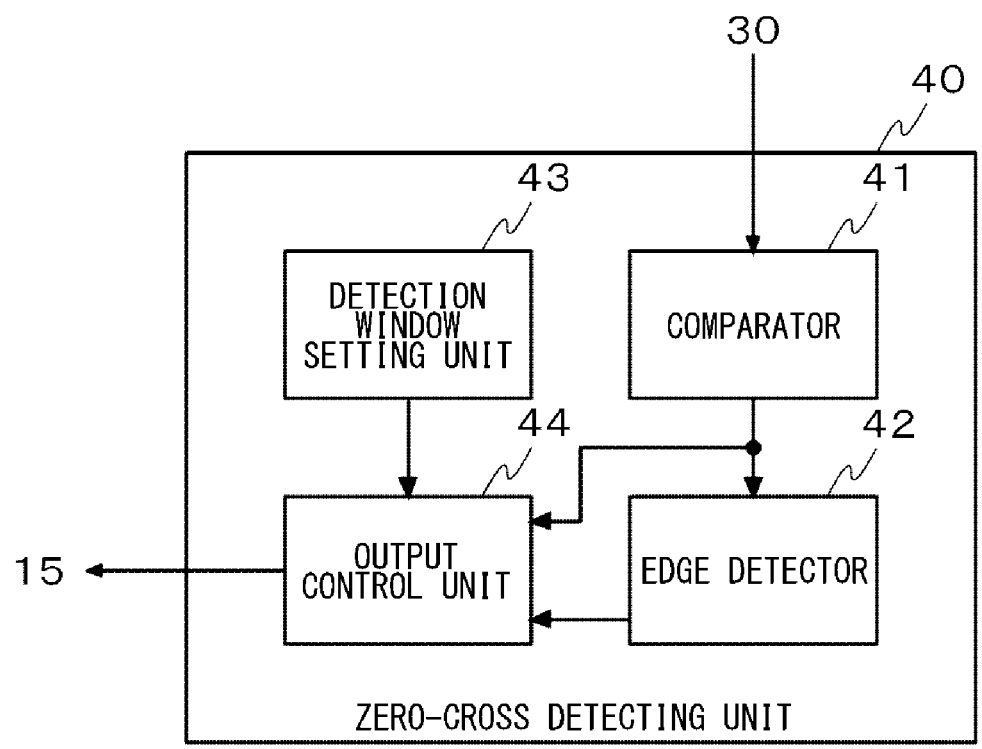
FIG. 16 shows an exemplary configuration of a zero-cross detecting unit having a detection window setting function.

FIG. 16 shows an exemplary configuration of the zero-cross detecting unit 40 having a detection window setting function. The zero-cross detecting unit 40 shown in FIG. 16 is configured such that a detection window setting unit 43 and an output control unit 44 are added to the zero-cross detecting unit 40 of FIG. 1. The detection widow setting unit 43 supplies a signal used to set a detection window, to the output control unit 44. More specifically, the detection window setting unit 43 supplies a detection window signal 2 and a detection window start signal to the output control unit 44.

Figure 17:
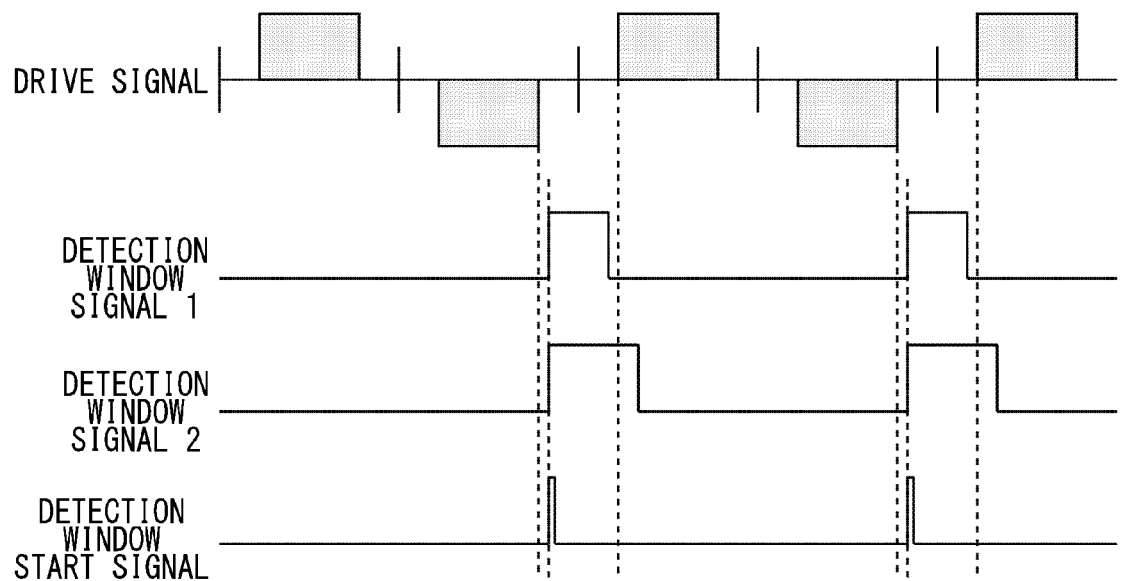
FIG. 17 is an illustration for explaining a detection window signal 1, a detection window signal 2 and a detection window start signal.

FIG. 17 is an illustration for explaining a detection window signal 1, a detection window signal 2 and a detection window start signal. The detection window signal 1 is a signal generated based on the above-described knowledge. In other words, the detection window signal 1 is the signal where the detection window set in a period which lies within (inwardly) and narrower than a conducting period is set. In comparison with the detection window signal 1, the detection window signal 2 is a signal where an end position of the detection window extends to a position containing a start position of a subsequent conducting period. Thereby, the comparator 41 inverts the output by not only the zero cross of the induced voltage but also the zero cross of a drive voltage supplied during this conducting period. The detection window start signal is a signal that indicates a start position of the detection window. More specifically, the detection window start signal is the signal where an edge rises at the start position of the detection window.

Referring back to FIG. 16, if the output of the comparator 41 is not inverted at the start position of the detection window, the output control unit 44 will supply an edge position detected by the edge detector 42, as the detection position of the zero cross, to the drive signal generating unit 10 (more precisely, the second latch circuit 15). If the output of the comparator 41 has already been inverted at the start position of the detection window, the output control unit 44 will supply the start position of the detection window, as the detection position of the zero cross, to the drive signal generating unit 10 (more precisely, the second latch circuit 15). A description is given hereunder of an exemplary configuration of the output control unit 44 to realize these processings.

Figure 18:
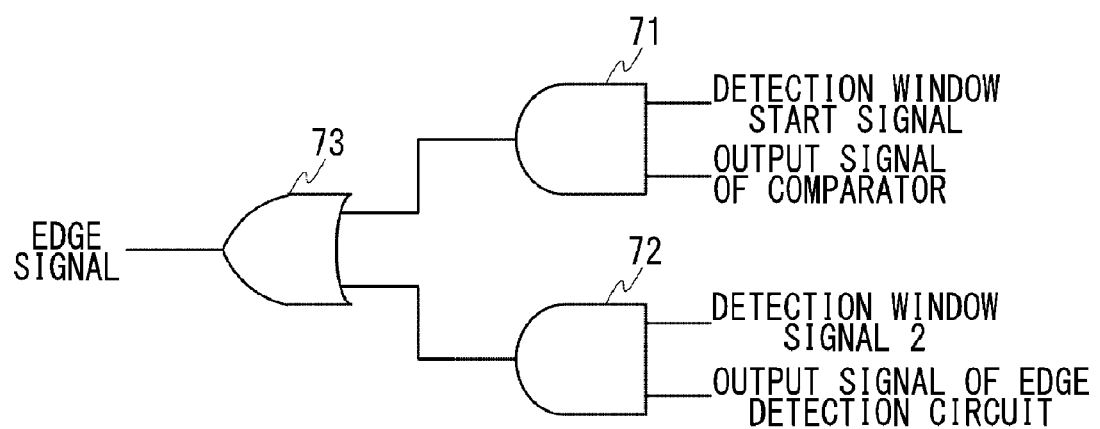
FIG. 18 shows an exemplary configuration of an output control unit.

FIG. 18 shows an exemplary configuration of the output control unit 44. The output control unit 44 includes a first AND gate 71, a second AND gate 72, and an OR gate 73. The detection window start signal and an output signal of the comparator 41 are inputted to the first AND gate 71. The first AND gate 71 outputs a high-level signal when both the detection window start signal and the output signal of the comparator 41 go high, whereas the first AND gate 71 outputs a low-level signal when at least one of the detection window start signal and the output signal of the comparator 41 goes low. More specifically, the first AND gate 71 outputs a high-level signal when the output of the comparator 41 has already been inverted at the start position of the detection window.

The detection window signal 2 and an output signal of the edge detector 42 are inputted to the second AND gate 72. The second AND gate 72 outputs a high-level signal when both the detection window signal 2 and the output signal of the edge detector 42 go high, whereas the second AND gate 72 outputs a low-level signal when at least one of the detection window signal 2 and the output signal of the edge detector 42 goes low. More specifically, the second AND gate 72 outputs a high-level signal when an edge rises in the output signal of the edge detector 42 within the detection window.

An output signal of the first AND gate 71 and an output signal of the second AND gate 72 are inputted to the OR gate 73. The OR gate 73 outputs an edge signal, based on the both output signals. The OR gate 73 outputs a high-level signal when at least one of the both output signals goes high, whereas the OR gate 73 outputs a low-level signal when the both output signals go low. More specifically, the OR gate 73 outputs a high-level signal when the output of the comparator 41 has already been inverted at the start position of the detection window. If the output of the comparator 41 is not inverted at the start position of the detection window, the OR gate 73 will output a high-level signal when an edge rises in the output signal of the edge detector 42 within the detection window.

Figure 19A:
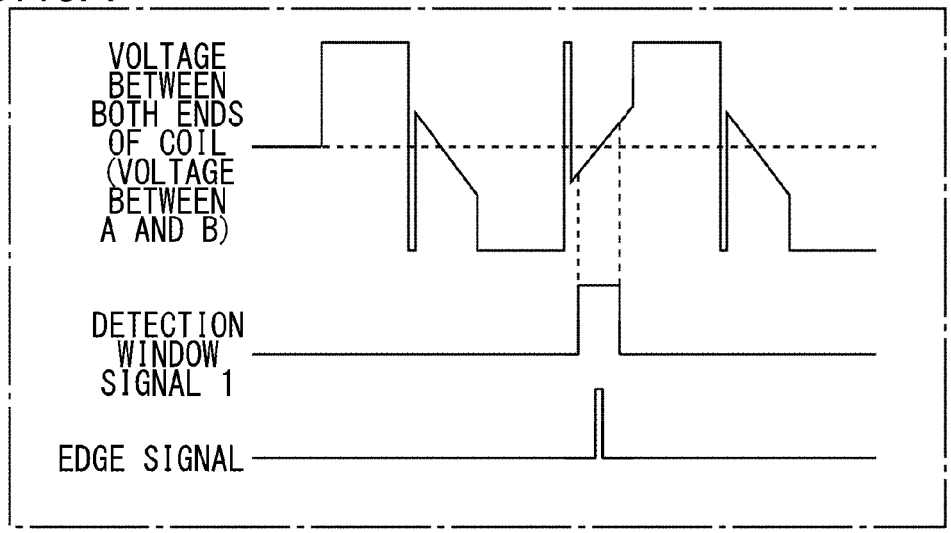
FIGS. 19A, 19B and 19C are illustrations for explaining operations of a zero-cross detecting unit (a detection window start signal being not used) that uses a detection window signal 1.
Figure 19B:
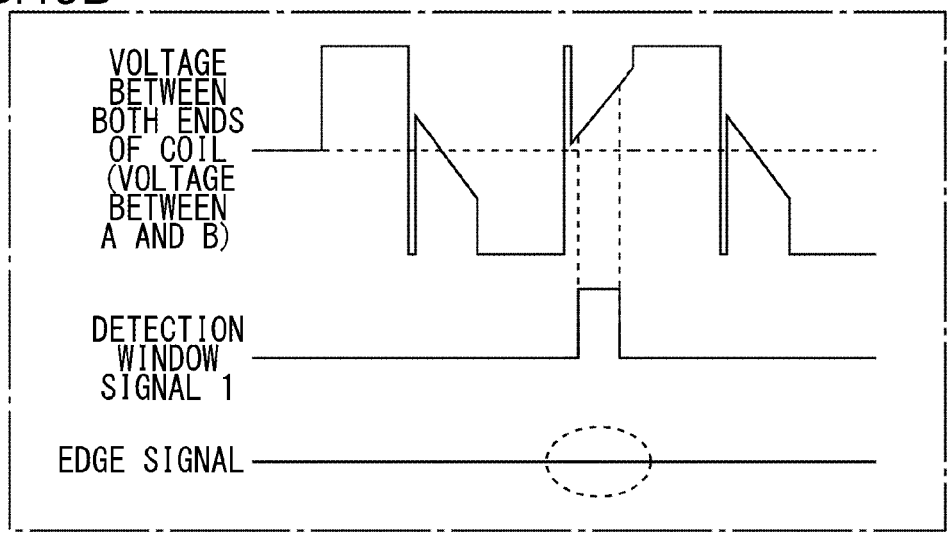
Figure 19C:
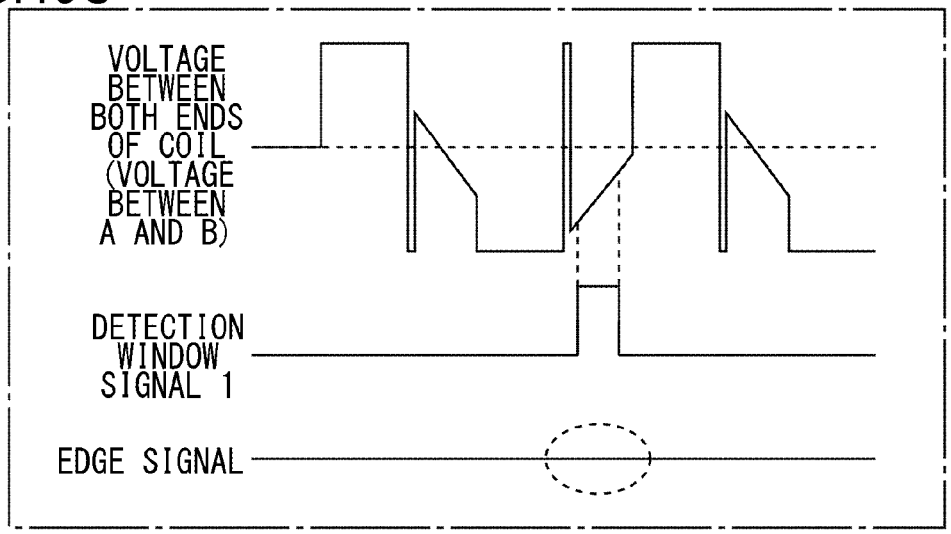

FIGS. 19A, 19B and 19C are illustrations for explaining operations of the zero-cross detecting unit 40 (the detection window start signal being not used) that uses the detection window signal 1. FIG. 19A shows the transitions of voltage across the coil L1 and edge signal when a zero cross of the induced voltage occurs within the detection window. FIG. 19B shows the transitions of voltage across the coil L1 and edge signal when the zero cross of the induced voltage does not occur within the detection window (the drive frequency being strictly less than the resonance frequency). FIG. 19C shows the transitions of voltage across the coil L1 and edge signal when the zero cross of the induced voltage does not occur within the detection window (the drive frequency being strictly greater than the resonance frequency).

In the zero-cross detecting unit 40 using the detection window signal 1 (the detection window start signal being not used), the output control unit 44 is constituted only by the second AND gate 72 shown in FIG. 18. The detection window signal 1 and the output signal of the edge detector 42 are inputted to the second AND gate 72.

In FIG. 19A, a zero cross of the induced voltage occurs in the detection window set by the detection window signal 1 and therefore an edge rises in the edge signal at a position where this zero cross occurs. Since the detection window is set, the edge does not rise in the edge signal at a position where the zero cross of regenerative voltage occurs.

FIG. 19B shows a state where the resonance frequency of the linear vibration motor 200 is higher than the frequency of the drive signal and the difference therebetween is relatively large. Thus, the stopped state of the linear vibration motor 200 that is to generate the zero cross of the induced voltage does not occur. Here, the stopped state thereof indicates that the vibrator 220 of the linear vibration motor 200 is located in a maximum reachable point at a south pole side or in a maximum reachable point at a north pole side. The stopped state ends at the point when it enters the detection window. In this case, the edge does not rise in the edge signal (see the curve surrounded by a dotted ellipse) in the zero-cross detecting unit 40 that uses the detection window signal 1 (the detection windrow start signal being not used).

FIG. 19C shows a state where the resonance frequency of the linear vibration motor 200 is lower than the frequency of the drive signal and the difference therebetween is relatively large. Thus, the stopped state of the linear vibration motor 200 that is to generate the zero cross of the induced voltage does not occur in the detection window. The stopped state occurs after it exits from the detection window. In this case, the edge does not rise in the edge signal (see the curve surrounded by a dotted ellipse) in the zero-cross detecting unit 40 that uses the detection window signal 1 (the detection windrow start signal being not used).

Figure 20A:
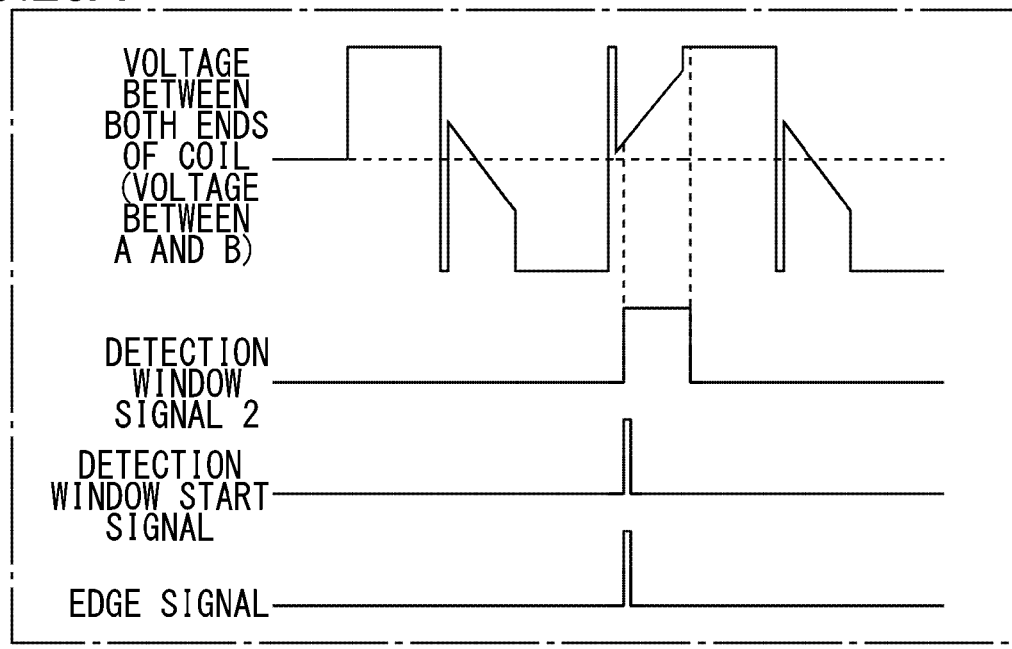
FIGS. 20A and 20B are illustrations for explaining operations of a zero-cross detecting unit that uses a detection window signal 2 and a detection window start signal.
Figure 20B:
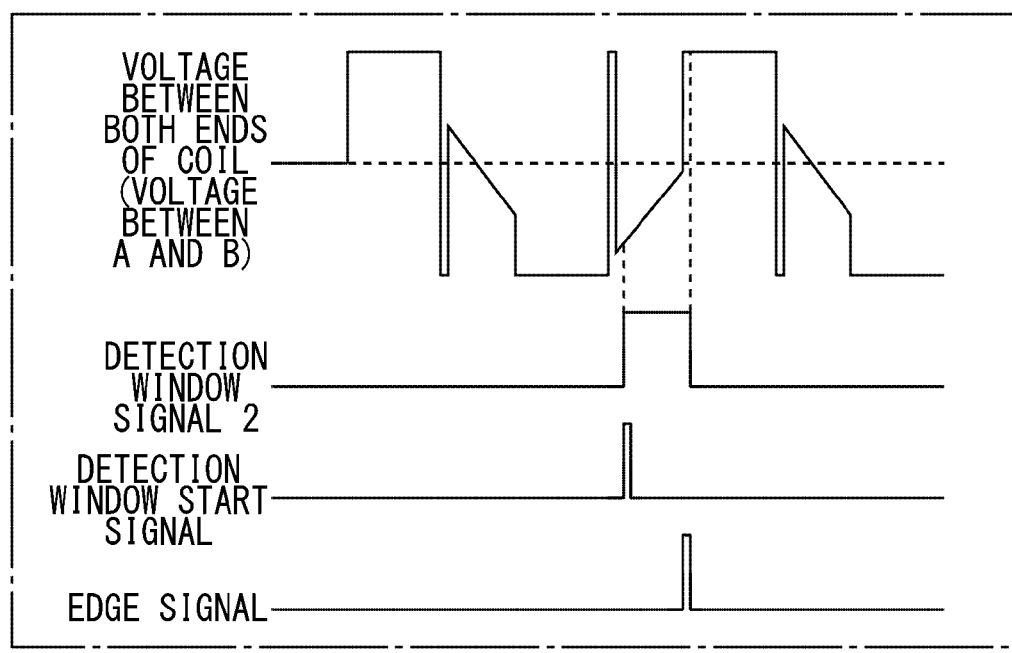

FIGS. 20A and 20B are illustrations for explaining operations of the zero-cross detecting unit 40 that uses the detection window signal 2 and the detection window start signal. FIG. 20A shows the transitions of voltage across the coil L1 and edge signal when the zero cross of the induced voltage does not occur within the detection window (the drive frequency being strictly less than the resonance frequency). FIG. 20B shows the transitions of voltage across the coil L1 and edge signal when the zero cross of the induced voltage does not occur within the detection window (the drive frequency being strictly greater than the resonance frequency).

In the zero-cross detecting unit 40 using the detection window signal 2 and the detection window start signal, the output control unit 44 as shown in FIG. 18 is used. The transition of voltage across the coil L1 shown in FIG. 20A is similar to that shown in FIG. 19B. The transition of voltage across the coil L1 shown in FIG. 20B is similar to that shown in FIG. 19C.

In FIG. 20A, an edge rises in the edge signal at the start position of the detection window by the operations of the first AND gate 71 and the OR gate 73 shown in FIG. 18. In FIG. 20B, an edge rises in the edge signal at the start position of a positive current conduction by the operation of the extended end position of the detection window.

By setting the detection window as described above, the degree of accuracy in detecting the zero cross of the induced voltage occurring in the coil L1 can be improved when the cycle width of the drive signal is adaptively controlled in such a manner that the eigen frequency of the linear vibration motor is made to agree with the frequency of the drive signal of the linear vibration motor. In other words, detecting by mistake the zero cross of the drive voltage and the regenerative voltage can be prevented.

If a large displacement occurs between the resonance frequency of the linear vibration motor 200 and the frequency of the drive signal of the linear vibration motor while the detection window is being set, a zero cross of the induced voltage may be located outside the detection window. According to the present embodiment, a temporary edge is set in the neighborhood of the start position or the end position of the detection window, so that an adaptive control of the cycle width of the drive signal can be continuously performed without any interruption. Thus, even though there is a large gap between the resonance frequency and the frequency of the drive signal, the both frequencies can be gradually brought close to each other using the temporary edge.

As described above, the adaptive control is constantly performed in such a manner that the resonance frequency of the linear vibration motor 200 is made to agree with the frequency of the drive signal of the linear vibration motor. Thus, even though the accuracy of a built-in oscillator that generates the basic clocks in the drive control circuit 100 deteriorates, there is no need to trim the frequency of the built-in oscillator, thereby significantly contributing to a reduction in production cost of driver ICs (the drive control circuits 100).

Also, the temporary edge set in the neighborhood of the end position of the detection window may use a rising edge of the conducting period that follows a nonconducting period, so that the control of signals can be simplified. In such a case, signals, other than the detection window signal, such as the above-described detection window start position signal is not longer required.

The description of the present invention given above is based upon illustrative embodiments. These embodiments are intended to be illustrative only and it will be obvious to those skilled in the art that various modifications to constituting elements and processes could be further developed and that such additional modifications are also within the scope of the present invention.

The above-described second rise control is applicable to a drive control circuit that drives the linear vibration motor 200 using a drive signal that does not contain the nonconducting period. In this case, the drive signal is such that the positive current conducting period and the negative current conducting current are alternately set without the nonconducting period inserted therebetween. That is, the above-described second rise control is applicable to a drive control circuit that does not perform the above-described adaptive control of the cycle width of the drive signal. Similarly, the above-described stop control is applicable to the drive control circuit that drives the linear vibration motor 200 using a drive signal that does not contain the nonconducting period. That is, the above-described stop control is applicable to the drive control circuit that does not perform the above-described adaptive control of the cycle width of the drive signal.

While the preferred embodiments of the present invention and the modifications to the embodiments have been described using specific terms, such description is for illustrative purposes only, and it is to be understood that changes and variations may still be further made without departing from the spirit or scope of the appended claims.

What is claimed is:

1. A drive control circuit of a linear vibration motor, having a stator and a vibrator at least one of which is constituted by an electromagnet, which vibrates the vibrator relative to the stator by supplying a drive current to a coil of the electromagnet, the drive control circuit comprising:
    a drive signal generating unit configured to generate a drive signal used to alternately deliver a positive current and a negative current to the coil with an nonconducting period inserted between conducting periods;
    a driver unit configured to generate the drive current in response to the drive signal generated by said drive signal generating unit so as to supply the drive current to the coil;
    an induced voltage detector configured to detect an induced voltage occurring in the coil during the nonconducting period; and
    a zero-cross detecting unit configured to detect a zero cross of the induced voltage detected by said induced voltage detector,
    wherein said drive signal generating unit estimates an eigen frequency of the linear vibration motor based on a detected position of the zero cross thereof, and the frequency of the drive signal is brought close to the estimated eigen frequency, and
    wherein said zero-cross detecting unit sets a detection window for avoiding the detection of zero cross of voltages other than the induced voltage, and
    said zero-cross detecting unit enables a zero cross detected within the detection window and disables a zero cross detected outside the detection window.

2. A drive control circuit of a linear vibration motor according to claim 1, wherein when the zero cross is not detected within the detection window and the zero cross of the induced voltage has been completed at a start position of the detection window, said zero-cross detecting unit assumes that a zero cross has been detected in the neighborhood of the start position of the detection window and supplies the assumed detection position of the zero cross to said drive signal generating unit.

3. A drive control circuit of a linear vibration motor according to claim 2, said zero-cross detecting unit including:
    a comparator configured to compare the induced voltage detected by said induced voltage detector with a reference voltage used to detect the zero cross;
    an edge detector configured to detect a position where an output of the comparator is inverted, as an edge; and
    an output control unit configured to supply an edge position detected by the edge detector, as the detection position of the zero cross, to said drive signal generating unit when the output of the comparator is not inverted at the start position of the detection window, and
    configured supply the start position of the detection window, as the detection position of the zero cross, to said drive signal generating unit, when the output of the comparator has already been inverted at the start position of the detection window.

4. A drive control circuit of a linear vibration motor according to claim 1, wherein when the zero cross is not detected within the detection window and the zero cross of the induced voltage has not been completed at an end position of the detection window, said zero-cross detecting unit assumes that a zero cross has been detected in the neighborhood of the end position of the detection window and supplies the assumed detection position of the zero cross to said drive signal generating unit.

5. A drive control circuit of a linear vibration motor according to claim 4, wherein said induced voltage detector detects a voltage across the coil in a conducting period of the drive signal,
    said zero-cross detecting unit including:
        a comparator configured to compare the voltage across the coil detected by said induced voltage detector with a reference voltage used to detect the zero cross; and
        an edge detector configured to detect a position where an output of the comparator is inverted, as an edge,
    wherein the end position of the detection window extends to a position containing a start position of a subsequent conducting period, and wherein the comparator inverts the output thereof by not only the zero cross of the induced voltage but also the zero cross of the drive voltage supplied during the conducting period.

* * * * *